(12) United States Patent
Intrieri et al.

(10) Patent No.: US 11,329,603 B2
(45) Date of Patent: May 10, 2022

(54) HYBRID SUPPLEMENTAL SOLAR ENERGY COLLECTION AND DISSIPATION SYSTEM WITH ONE OR MORE HEAT PUMPS

(71) Applicant: Sun Drum Solar, LLC, Northborough, MA (US)

(72) Inventors: Michael Intrieri, Northborough, MA (US); Albert Nunez, Silver Spring, MD (US)

(73) Assignee: Sun Drum Solar, LLC, Northborough, MA (US)

( * ) Notice: Subject to any disclaimer, the term of this patent is extended or adjusted under 35 U.S.C. 154(b) by 0 days.

(21) Appl. No.: 14/630,201

(22) Filed: Feb. 24, 2015

(65) Prior Publication Data

US 2016/0079915 A1    Mar. 17, 2016

Related U.S. Application Data

(60) Provisional application No. 61/944,338, filed on Feb. 25, 2014.

(51) Int. Cl.
  *H02S 40/44*    (2014.01)
  *F24D 19/10*    (2006.01)
  (Continued)

(52) U.S. Cl.
  CPC ......... *H02S 40/44* (2014.12); *F24D 11/0221* (2013.01); *F24D 19/1045* (2013.01);
  (Continued)

(58) Field of Classification Search
  CPC .................................. H02S 40/44; F24J 2/345
  See application file for complete search history.

(56) References Cited

U.S. PATENT DOCUMENTS 4,002,031 A    1/1977 Bell
4,080,221 A    3/1978 Manelas
(Continued)

FOREIGN PATENT DOCUMENTS

CN    203352485 U    12/2013
CN    203464537 U    3/2014
(Continued)

OTHER PUBLICATIONS

Written Opinion of the International Searching Authority dated Jun. 4, 2015 for International Application No. PCT/US2015/017440, 8 pages.

(Continued)

*Primary Examiner* — Tae-Sik Kang
(74) *Attorney, Agent, or Firm* — Iandiorio Teska & Coleman, LLP

(57) ABSTRACT

A hybrid supplemental solar energy collection and dissipation system with one or more heat pumps is featured. The system includes one or more commercially available photovoltaic panels configured to convert incident radiation to electricity. One or more supplemental solar energy collectors having a flow of fluid therein are selectively coupled to the one or more photovoltaic panels. The one or more supplemental solar energy collectors are configured to collect thermal energy from the one or more photovoltaic panels, radiate thermal energy to space, collect thermal energy from the environment and/or dissipate thermal energy to the environment to heat or cool one or more loads. One or more heat pumps are coupled to the one or more supplemental solar energy collectors and the one or more loads and are configured to amplify heating and/or cooling of the one or more loads.

20 Claims, 17 Drawing Sheets

(51) Int. Cl.
*F24D 11/02* (2006.01)
*F28D 20/00* (2006.01)
*F24S 80/30* (2018.01)
*F25B 27/00* (2006.01)
*F24S 20/00* (2018.01)

(52) U.S. Cl.
CPC .......... *F24S 80/30* (2018.05); *F25B 27/002* (2013.01); *F28D 20/0034* (2013.01); *F24D 2200/02* (2013.01); *F24D 2200/12* (2013.01); *F24D 2200/14* (2013.01); *F24S 2020/17* (2018.05); *Y02B 10/20* (2013.01); *Y02B 10/70* (2013.01); *Y02E 10/40* (2013.01); *Y02E 10/60* (2013.01); *Y02E 60/14* (2013.01); *Y02E 70/30* (2013.01)

(56) References Cited

U.S. PATENT DOCUMENTS

| | | |
|---|---|---|
| 4,095,997 A | 6/1978 | Griffiths |
| 4,128,124 A | 12/1978 | Worthington |
| 4,142,511 A | 3/1979 | Doughty et al. |
| 4,147,157 A | 4/1979 | Zakhariya |
| 4,165,037 A | 8/1979 | McCarson |
| 4,245,619 A | 1/1981 | Ogilvie |
| 4,287,883 A | 9/1981 | Kyrias |
| 4,291,833 A * | 9/1981 | Franchina ........... F24D 11/0264 126/400 |
| 4,392,008 A | 7/1983 | Cullis et al. |
| 5,851,309 A | 12/1998 | Kousa |
| 6,029,656 A | 2/2000 | Schwartz |
| 6,080,927 A | 6/2000 | Johnson |
| 6,402,897 B1 | 6/2002 | Gunn |
| 6,630,622 B2 | 10/2003 | Konold |
| 6,689,949 B2 | 2/2004 | Ortabasi |
| 6,730,840 B2 | 5/2004 | Sasaoka et al. |
| 7,076,965 B2 | 7/2006 | Lasich |
| 8,455,755 B2 | 6/2013 | Correia et al. |
| 8,733,429 B2 | 5/2014 | Harrison et al. |
| 8,835,745 B2 | 9/2014 | Intrieri et al. |
| 2002/0121298 A1* | 9/2002 | Konold .................... F24J 2/085 136/248 |
| 2004/0011395 A1 | 1/2004 | Nicoletti et al. |
| 2004/0025931 A1 | 2/2004 | Aguglia |
| 2007/0079865 A1 | 4/2007 | Warfield et al. |
| 2007/0089375 A1 | 4/2007 | Helner et al. |
| 2007/0186922 A1 | 8/2007 | Guenter |
| 2007/0205298 A1* | 9/2007 | Harrison ............. F24D 11/0221 237/2 B |
| 2008/0302405 A1 | 12/2008 | Intrieri |
| 2009/0065046 A1 | 3/2009 | DeNault |
| 2009/0084430 A1 | 4/2009 | Intrieri et al. |
| 2010/0242517 A1 | 9/2010 | Johnson |
| 2011/0030404 A1 | 2/2011 | Gurin |
| 2011/0048502 A1* | 3/2011 | Kikinis ............... F24D 11/0221 136/248 |
| 2011/0139221 A1 | 6/2011 | Giritsch |
| 2012/0247134 A1 | 10/2012 | Gurin |
| 2013/0112237 A1 | 5/2013 | Almogy et al. |

FOREIGN PATENT DOCUMENTS

| | | |
|---|---|---|
| DE | 102011105309 A1 | 12/2012 |
| JP | 10-062017 | 3/1998 |
| WO | WO 2009/061495 A1 | 5/2009 |
| WO | WO 2013/144749 A2 | 10/2013 |
| WO | WO 2014/134405 A1 | 9/2014 |

OTHER PUBLICATIONS

3M VHB™ Tapes, Technical Data, Jun. 2011, 3M Industrial Adhesives and Tapes Division, St. Paul, MN, 10 pages.
International Searching Authority, Written Opinion of International Application No. PCT/US08/12615, dated Jan. 16, 2009, 9 pages.
International Searching Authority, Written Opinion of International Application No. PCT/US08/06930, dated Aug. 29, 2008, 7 pages.

* cited by examiner

HYBRID SUPPLEMENTAL SOLAR ENERGY COLLECTION AND DISSIPATION SYSTEM WITH ONE OR MORE HEAT PUMPS

RELATED APPLICATIONS

This application claims benefit of and priority to U.S. Provisional Application Ser. No. 61/944,338 filed Feb. 25, 2014 under 35 U.S.C. §§ 119, 120, 363, 365, and 37 C.F.R. § 1.55 and § 1.78 and is incorporated herein by this reference.

FIELD OF THE INVENTION

This invention relates to a hybrid supplemental solar energy collection and dissipation system with one or more heat pumps.

BACKGROUND OF THE INVENTION

Industry efforts to maximize the use of Solar Energy are a major focus. The sun provides the earth more daily energy than any other source on the planet. However, conventional attempts to harness this energy continue to prove difficult. Two of the largest energy demands are space heating and cooling. However due to the intermittent nature of the sun, use of solar energy in these spaces has been difficult. Heat pump technology provides a unique way to amplify solar energy. A heat pump is a device which is able to take energy at one temperature range and transform that energy to a different temperature range, either higher or lower in temperature. The transformed energy offers a source of energy that could be used to supplement solar collector systems. However, to date, conventional solar thermal collectors are unable to be used directly with one or more heat pumps for both heating and cooling.

BRIEF SUMMARY OF THE INVENTION

In one aspect, a hybrid, supplemental, solar energy collection and dissipation system with one or more heat pumps is featured. The system includes one or more commercially available photovoltaic panels configured to convert incident radiation to electricity. One or more supplemental solar energy collectors are selectively coupled to the one or more photovoltaic panels. The one or more supplemental solar energy collectors are configured to collect thermal energy from the one or more photovoltaic panels, radiate thermal energy to space, collect thermal energy from the environment and/or dissipate thermal energy to the environment to heat or cool one or more loads. One or more heat pumps coupled to the one or more supplemental solar energy collectors and the one or more loads are configured to amplify heating and/or cooling of the one or more loads.

In one embodiment, the one or more supplemental solar energy collectors may be configured to have a portion thereof directly exposed to the environment to efficiently dissipate and/or radiate the thermal energy. The one or more supplemental solar energy collectors may include one or more thermally conductive surfaces. The one or more thermally conductive surfaces may include a top surface directly coupled to the photovoltaic panels. The one or more thermally conductive surfaces may include a bottom surface directly exposed to the environment. The one or more heat pumps may include a source side with a source input port for receiving a flow of fluid from the one or more supplemental solar energy collectors and a source output port for returning a flow of fluid to the supplemental solar energy collectors. The one or more heat pumps may include a load side with a load input port for receiving a flow of fluid from the one or more loads and a load output port for outputting a flow of fluid to the one or more loads. The one or more heat pumps may include a fluid-to-fluid heat pump. The one or more loads may include one or more thermal storage masses. The one or more loads may include one or more of: a storage tank, a swimming pool, a solar thermal storage tank, a heat exchanger storage tank, a hot water tank, a backup boiler, a water heater, a solar glycol loop, a radiant floor and/or ceiling and/or wall loop, a fan coil for space heating and/or cooling, a baseboard loop, a spa, and a hot tub. The system may include a plurality of valves coupled to the one or more solar energy collectors, the one or more heat pumps, and the one or more loads configured to bypass the heat pump at one predetermined condition such that thermal energy in a flow of fluid from the one or more solar energy collectors is directed to heat and/or cool the one or more loads. The plurality of valves may be configured to direct the flow of fluid from the one or more solar energy collectors to a source input port of the heat pump and a flow of fluid from the load to a load input port of the one or more heat pumps at another predetermined condition to amplify the heating and/or cooling of the one or more loads. The one or more supplemental solar energy collectors may be configured to extract thermal energy from the photovoltaic panels and/or extract thermal energy from the environment at one predetermined condition to heat one or more of the one or more loads and/or radiate thermal energy to space and/or dissipate thermal energy to the environment to cool another of the one or more loads at a second predetermined condition. The one or more heat pumps may be configured to amplify the heating and/or cooling of the one or more loads. The thermal energy extracted from the one or more solar energy collectors and/or the environment may be stored in one or more of the one or more loads. The one or more heat pumps may be configured to use the stored thermal energy in one or more of the one or more loads to amplify heating and/or cooling of another of the one or more loads. The system may include a plurality of temperature sensors coupled to the solar energy collectors, and the one or more loads. The system may include a circulator pump on a return line to the one or more supplemental solar energy collectors configured to drive fluid to one or more of the supplemental solar energy collectors. The system may include a circulator pump on a supply line from the one or more supplemental solar energy collectors configured to draw fluid from the one or more supplemental solar energy collectors. The system may include a controller coupled to the one or more temperature sensors, the plurality of valves, the one or more heat pumps, and the circulator pump configured to control the flow of fluid from the solar energy collectors, the heat pump, and the one or more loads. The system may include a controller coupled to the one or more temperature sensors, the plurality of valves, the one or more heat pumps, and the circulator pump configured to control the flow of fluid from the solar energy collectors, the heat pump, and the one or more loads. The electrical energy needed to operate the heat pump may be configured to be drawn from the photovoltaic panels. The one or more heat pumps may include a first heat pump coupled to an input of a storage tank and a second heat pump coupled to an output of the storage tank.

In another aspect, an integrated, supplemental, solar energy collection and dissipation system with a heat pump is featured. The system includes one or more photovoltaic panels configured to convert incident radiation to electricity.

A housing includes a bottom surface made of a thermally conductive material mated to the photovoltaic panel, and one or more channels having a flow of fluid therein between the photovoltaic panel and the bottom configured to collect thermal energy from the one or more photovoltaic panels, radiate thermal energy to space, collect thermal energy from the environment and/or dissipate thermal energy to the environment to heat and/or cool one or more loads. One or more heat pumps coupled to the housing are configured to amplify heating and/or cooling of the load.

In another embodiment, the system may include a gasket between the bottom and each of the one or more photovoltaic panels configured to define the one or more channels. The bottom surface may be made of a highly thermally conductive material.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
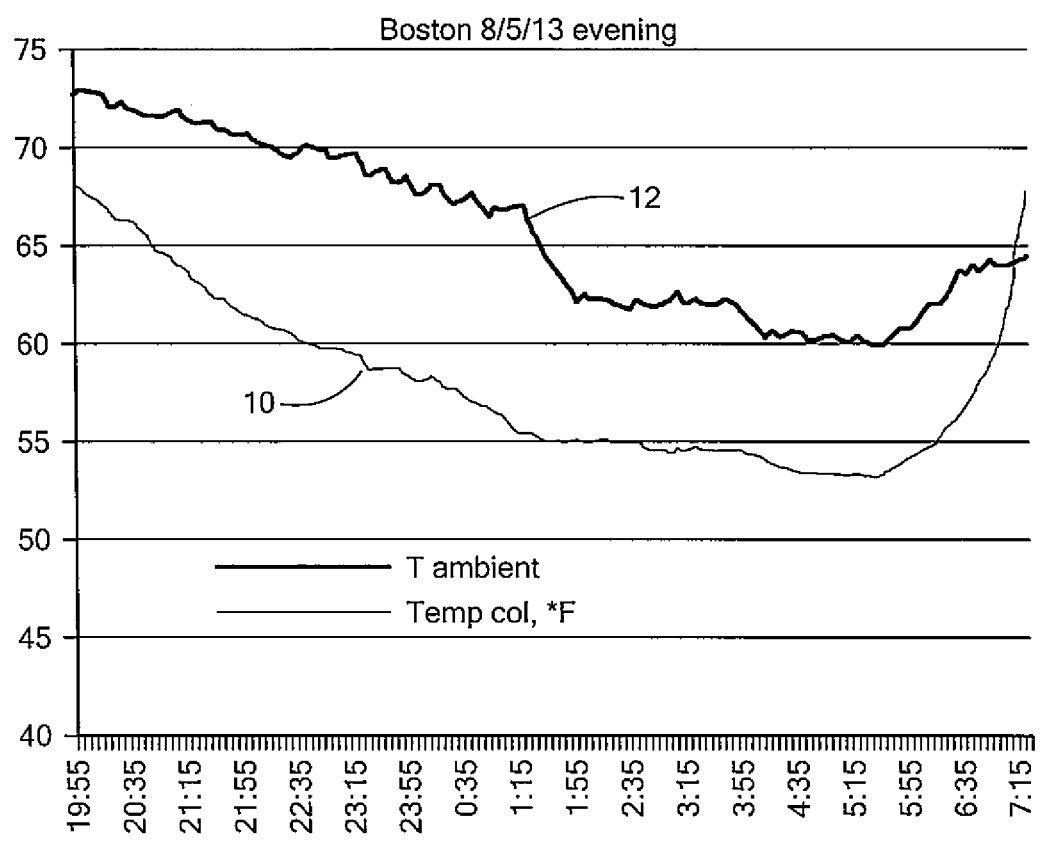
FIG. 1 depicts graphs showing examples of a collector temperature and the ambient air temperature for one exemplary night-time to demonstrate how much cooler a collector is when compared to the outside air temperature.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As will be discussed in further detail below, the hybrid supplemental solar energy collection and dissipation system with one or more heat pumps of one or more embodiments of this invention provides a solution to the problem of using heat pumps with conventional solar collectors. The hybrid supplemental solar energy collection and dissipation system with one or more heat pumps of one or more embodiment of this invention can integrate a conventional heat pump with one or more supplemental solar energy collectors, e.g., as disclosed in U.S. Publ. No. 2009/0084430, now U.S. Pat. No. 8,835,745 (the '745 patent), incorporated by reference herein, by the inventor hereof, and owned by SunDrum Solar, LLC to provide both heating and cooling. Heat pumps can be integrated with such supplemental solar energy collectors because they are an un-insulated thermal collector designed to "wick" the thermal energy away from the rear side of a photovoltaic (PV) panel. One or more supplemental solar energy collectors as disclosed herein and in the '745 patent act as a heat exchanger attached to a PV panel and are capable of both dissipating thermal energy to the atmosphere and collecting thermal energy. The unique method of collecting energy from the supplemental solar collectors is described in detail in the '745 patent.

Graph 10, FIG. 1, for a solar energy collector temperature and graph 12 for the ambient air temperature for the night-time of Aug. 5, 2013 demonstrate how much cooler a solar energy collector is when compared to the outside air temperature. Because PV panels are typically facing outer space, they benefit from radiating energy to space ("spatial cooling"). This can result in reducing the collector panel temperature significantly below the ambient air temperature. On cloudless evenings/nights, PVs may reach colder temperatures than ambient air thus providing additional capability to dissipate heat. This ability to re-radiate heat can be further enhanced by using water source heat pumps to amplify the heat dissipation.

By passing hot or warm fluid through one or more supplemental solar energy collectors, the collectors will dissipate its thermal energy to space. This type of system functions similar to an evaporative cooling tower at significantly lower power and water requirements. Spatial cooling, or nocturnal reradiating to space, which requires little to no power, replaces a cooling tower's evaporation. The high power fan typically used in cooling towers is also eliminated. The water or glycol/water circulation loop has similar power consumption requirements between the two systems.

For simple residential applications, the heat rejection discussed above can be used by providing a fluid loop from the solar array to a fan coil which in turn cools the air in the residential spaces (liquid to air). The ability of the system to cool is greater than an attic/whole house fan alone since it achieves below ambient temperatures where an attic/whole house fan can only cool to ambient. Such a system can also provide thermal (heating) energy during the sunlight hours when heating is desired.

For use in typically commercial applications, the ability to dissipate thermal energy can be amplified with a heat pump. There are at least two methods by which dissipated thermal energy can be amplified with a heat pump.

Light Cooling Load:

Using a storage tank (or "reservoir") to directly provide chilled water. In this example, the heat pump is used to amplify the temperatures to be dissipated to the atmosphere and bring the temperature of the water storage reservoir down, e.g., to about 45° F., or similar low temperature, each evening/night for next day use. Cooling is not limited to evening or night hours but by environmental conditions described in the algorithm section discussed in detail below.

Heavy Cooling Load:

In this example, an additional heat pump may be added to deliver air conditioning or chilled water to the customer load.

In both of the examples above, the output of the heat pump is amplification of the BTU capacity in the storage reservoir.

All of the systems discussed above can be reversed to provide space heating in addition to their use for space cooling. When in heating mode, the systems are also able to deliver heating year round and shift to cooling when desired. This shift can be instantaneous or seasonal depending on the intelligent control method of implementation.

Figure 2:
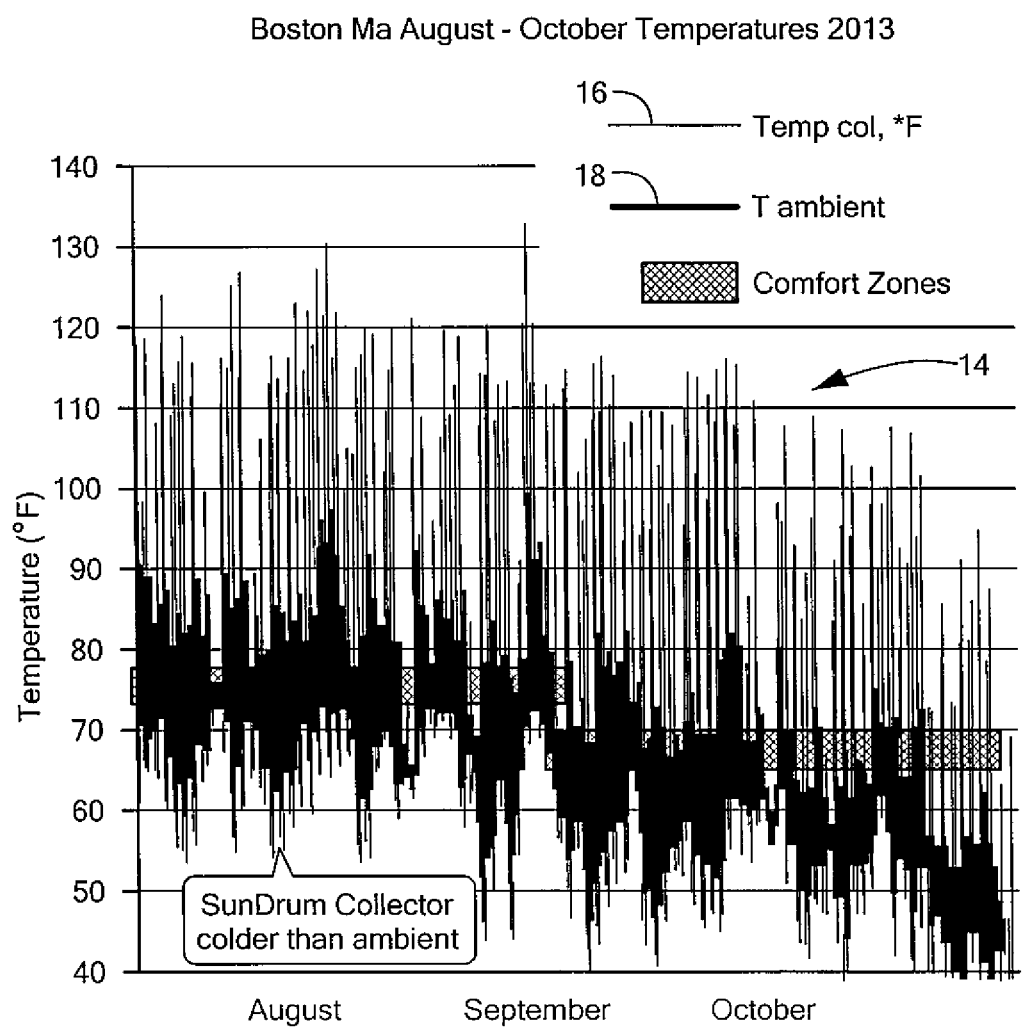
FIG. 2 depicts graphs showing examples of the daily temperature fluctuation of the temperature of a collector and ambient air temperature for a selected period of time.

Graph 14, FIG. 2, shows an example of the daily temperature fluctuations for collector temperature 16 and ambient air temperature 18 from August through October 2013 in Boston, Mass. One or more embodiments of hybrid supplemental solar energy collection and dissipation system with one or more heat pumps of this invention can provide heating of one or more loads, such as domestic hot water, a pool, a spa, and the like, during sunlight during the cooling season (e.g., in August). Then, when conditions allow, the hybrid supplemental solar energy collection and dissipation system with one or more heat pumps of one or more embodiment of this invention can shift over to dissipating thermal energy to space and either directly cool the load or cool down a storage tank for daytime use, as will be discussed in detail below.

In New England geography, or similar type geography, the night time temperatures with spatial cooling typically fall only into the 60° F. range. A residential application utility of hybrid supplemental solar energy collection and dissipation system with one or more heat pumps of one or more embodiment of this invention would still be better than an attic fan (whole house fan) to cool down the house at night and rely on the house's thermal mass to keep the house comfortable during the day. Alternatively, the system cooling function can be viewed as reducing the daily air conditioning electrical load for the owner while the electric portion of the hybrid solar array powers the air conditioner.

The hybrid supplemental solar energy collection and dissipation system with one or more heat pumps of one or more embodiments of this invention has the capability to increase solar radiant energy contribution to include hot water heating, space heating and cooling. The increased energy contribution means an increased cost savings.

For a commercial or large residential application, the addition of a heat pump to solar collectors as disclosed in one or more embodiments of the hybrid supplemental solar energy collection and dissipation system with one or more heat pumps of this invention can amplify the system's effectiveness.

Figure 3:
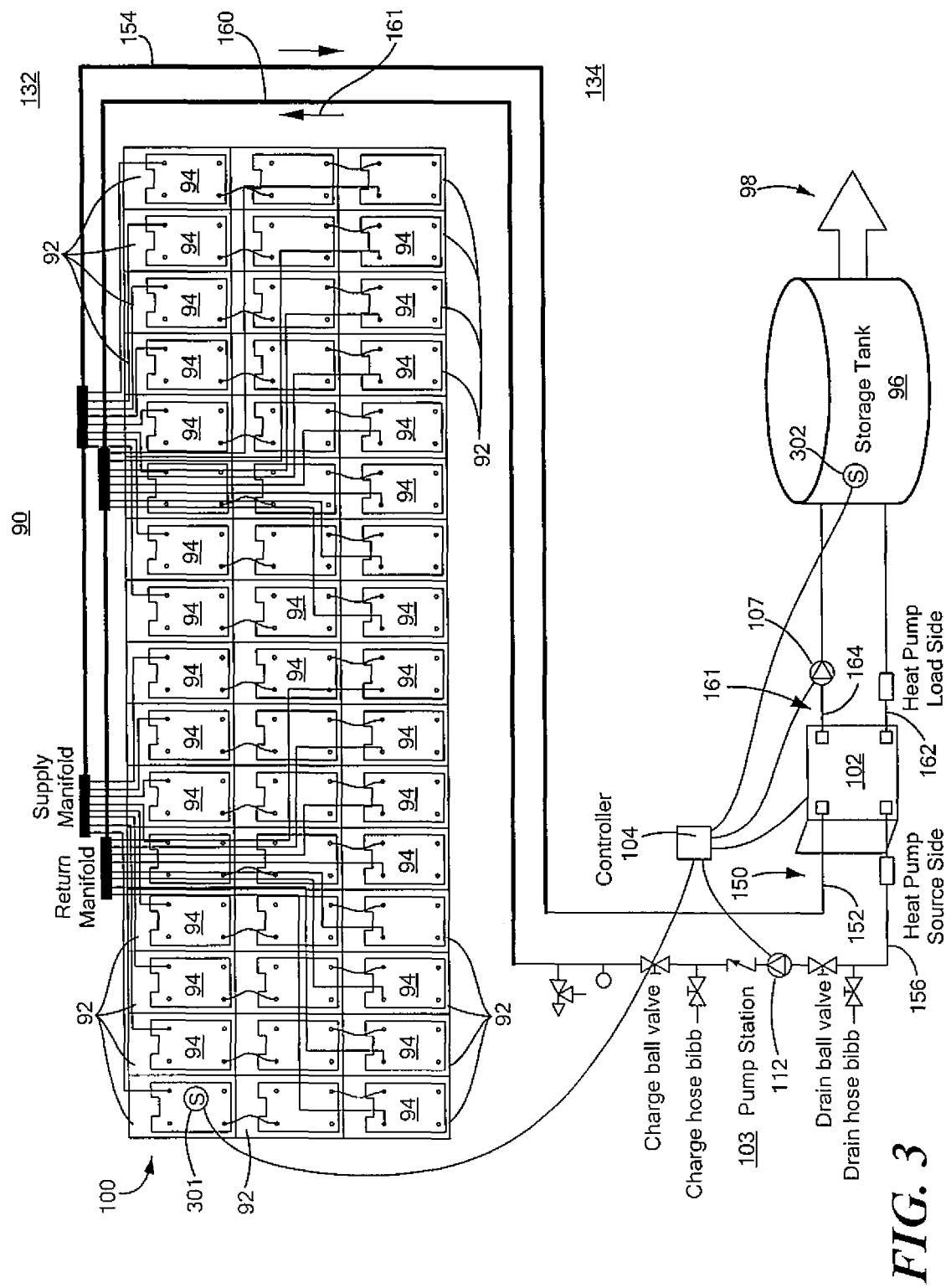
FIG. 3 is a schematic block diagram showing the primary components of one embodiment of the hybrid supplemental solar energy collection and dissipation system with one or more heat pumps of this invention.

Hybrid supplemental solar energy collection and dissipation system 90, FIG. 3, with one or more heat pumps of one embodiment of this invention includes one or more commercially available photovoltaic panels, exemplarily indicated at 92, configured to convert incident radiation to electricity.

System 90 also includes one or more supplemental solar energy collectors, exemplarily indicated at 94, selectively coupled to the one or more photovoltaic panels 92. The one or more supplemental solar energy collectors 94 have a flow of fluid therein, e.g., from supply line 154 and return line 160, and are configured to collect thermal energy from one or more photovoltaic panels 92, radiate thermal energy to space 132 collect thermal energy from the environment 134 and/or dissipate thermal energy to the environment 134 to heat or cool one or more loads.

Figure 4:
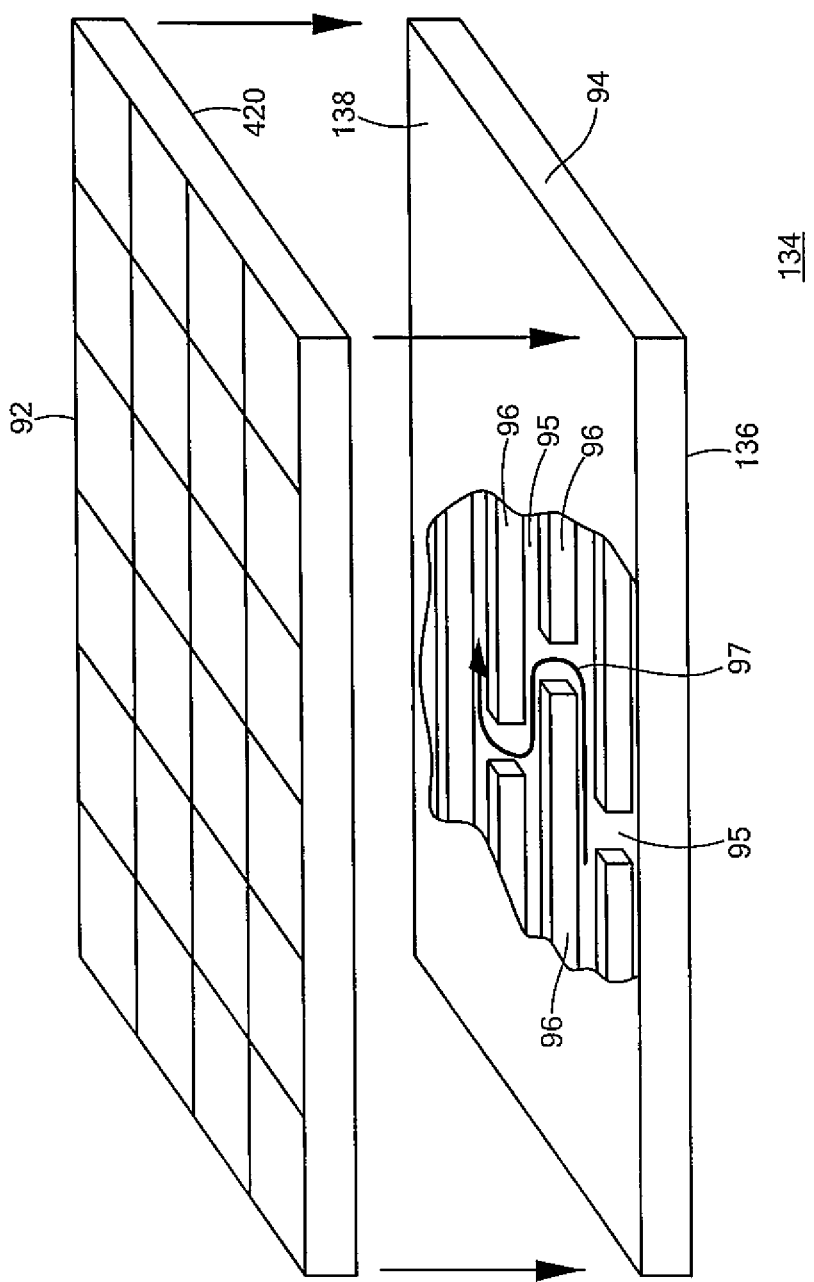
FIG. 4 is a schematic block diagram showing in further detail one example of the one or more supplemental solar energy collectors shown in FIG. 3

FIG. 4, where like parts include like numbers, shows in further detail one example of a supplemental solar energy collector 94 coupled to commercially available photovoltaic panels 92 which may be used by system 90. In this example supplemental solar energy collector 94 may include channels 95 which may be formed by plates or gaskets 96. Channels 95 preferably have flow of fluid 97 therein. Further details of one or more supplemental solar energy collectors 94 are disclosed in the '745 patent cited supra. Other equivalent supplemental solar energy collectors may be used as known by those skilled in the art.

The one more loads disclosed herein preferably include a thermal storage mass capable of storing thermal energy. In this example, the one or more loads may be storage tank 96, FIG. 3, or output load 98 from storage tank 98. In other examples, the one or more loads may include one or more of: a storage tank, a swimming pool, a solar thermal storage tank, a heat exchanger storage tank, a hot water tank, a backup boiler, a water heater, a solar glycol loop, a radiant floor and/or ceiling and/or wall loop, a fan coil for space heating and/or cooling, a baseboard loop, spa, and a hot tub, as discussed in further detail below with respect to FIGS. 6A-6B, 7A-7B and 12.

The one or more commercially available photovoltaic panels 92 and one or more supplemental solar energy collectors 94 may be configured as array 100 as shown (available from SunDrum Solar LLC, Northborough, Mass., Part No. SDM100-300). In this example, array 100 includes 48 SDM100-300 in 16 strings of three as shown. Other equivalent solar collectors may be used that function similarly.

One or more supplemental solar energy collectors 94 may be configured to have a portion thereof directly exposed to the environment to efficiently dissipate and/or radiate thermal energy. For example, supplemental solar energy collector 94, FIG. 4, shows one example of an exemplary supplemental solar collector 94 with bottom surface 136 directly exposed to environment 134 to efficiently dissipate and/or radiate thermal energy. Preferably, the one or more supplemental solar energy collectors 94 include one or more thermally conductive surfaces, such as top surface 136 or bottom surface 138. The thermally conductive surfaces are preferably made of a highly thermally conductive material, such as aluminum, copper, tungsten, brass, gold, silver, related alloys, a thermally conductive polymer, a thermally conductive resin, and the like.

System 90, FIG. 3, also includes one or more heat pumps 102 coupled to one or more supplemental solar energy collectors 94 and the one or more loads as shown configured to amplify heating and/or cooling of the one or more loads. In one design, one or more heat pumps 102 is preferably a reversible fluid-to-fluid heat pump capable or heating or cooling, such as a NDW100 (WaterFurnace International, Inc., Fort Wayne, Ind. 46809). Cooling is the transfer of thermal energy resulting in a drop in temperature of one desired fluid and the transfer of the energy to another. Heating is the transfer of energy resulting in an increase in temperature. For example, in cooling operation, fluid is received at input port 162 of one or more heat pumps 102 at one temperature, e.g., for exemplary purposes only, at about 80° F. One or more heat pumps 102 extract energy for transfer to source side 150 by returning the fluid to load port 164 at 70° F. This energy is transferred to source side 150 by receiving fluid at source port 152 at a temperature of 50° F. outputting the fluid to source output port 156 at a, temperature greater than 60° F. The temperature increase will include a large portion of the electrical energy needed to operate the heat pump. One or more supplemental solar energy collectors 94 will then dissipate this energy to keep the return fluid in line 154 at 50° F. The reverse process is done to provide heating.

One or more heat pumps 102 preferably includes source side 150 with input port 152 coupled to supply line 154 from one or more supplemental solar energy collectors 94 and output port 156 coupled to pump station 103 with circulator pump 112. In this example, circulator pump 112 is preferably coupled to return line 160 coupled to one or more supplemental solar energy collectors 94 and drives fluid by line 160 (shown by arrow 161) to one or more supplemental solar energy collectors 94 as shown. One or more heat pumps 102 also preferably includes load side 161 with input port 162 coupled to the one our more loads (in this example storage tank 96) and output port coupled 164 coupled to one or more loads.

System 90 also preferably includes controller 104 coupled to temperature sensor 301 located in one or more supplemental solar energy collectors 94 and temperature sensor 302 in storage tank 102 as shown.

In one exemplary operation of hybrid supplemental solar energy collection and dissipation system 90 with one or more heat pumps 102, FIG. 3, the nightly cooling capability would be approximately 18 tons an hour. For each 1000 gallons of storage, approximately 24 AC tons capacity can be generated by one or more heat pumps 102 and stored for daytime use. This example assumes the load, e.g., storage tank 96, is dropped to about 40° F. with a desired room temperature target of 75° F. The exemplary use of thermal storage by one or more heat pumps 102 would function similar to ice storage coolers, but at much lower energy cost. Hybrid supplemental solar energy collection and dissipation system 90 with one or more heat pumps 102 may be designed such that it incorporates one or more loads e.g., a thermal storage mass, such as storage tank 96 or equivalents thereof discussed in further detail below, capable of storing energy through a phase change from liquid to solid. This example preferably uses a fluid that does not freeze below 32° F. If storing additional energy through phase change of liquid to solid storage is desired, a thermal storage mass, such as storage tank 96 with heat exchange would require the structural capability to handle phase change stresses.

In the example shown in FIG. 3, hybrid supplemental solar energy collection and dissipation system 90 with one or more heat pumps 102 is used for only cooling or only heating. A typical cooling application for system 90 may be a data storage center, or similar type environment, that does not require any heating. In this example, when conditions allow, hybrid supplemental solar energy collection and dissipation system 90 with one or more heat pumps 102 cools the one or more loads, e.g., storage tank 96, for use with the air conditioning system of a building or similar type uses. When the one or more loads are active, e.g., load output 98 from storage tank 96 and system 90 is enabled, system 90 provides direct supplement cooling. When load 98 is inactive, cooling energy is stored in storage tank 96. Hybrid supplemental solar energy collection and dissipation system 90 with one or more heat pumps 102 can be adjusted for heating or cooling during different seasons or environmental conditions.

Figure 5:
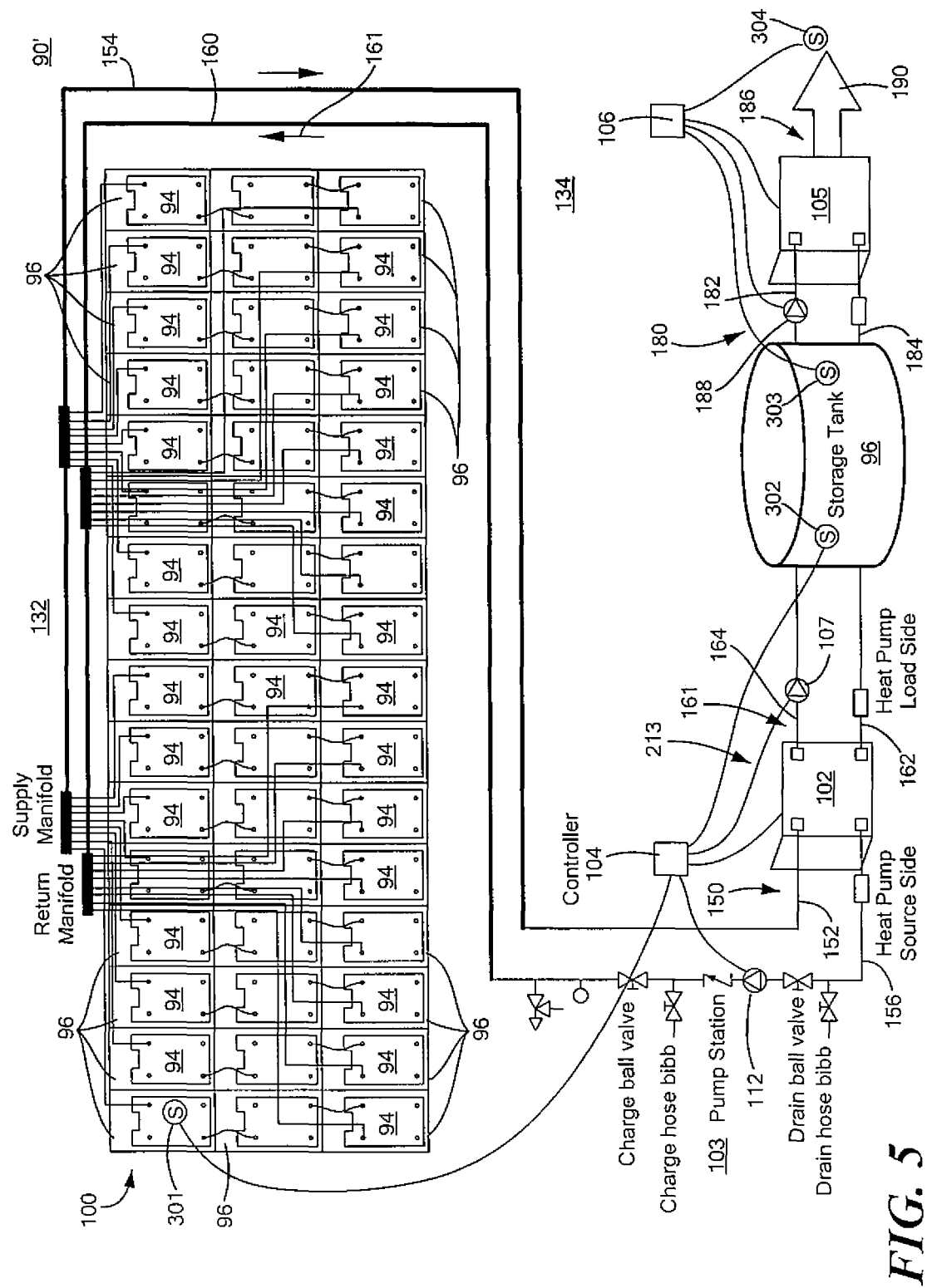
FIG. 5 is a schematic block diagram showing the primary components of another embodiment of the hybrid supplemental solar energy collection and dissipation system with one or more heat pumps of this invention.

For large commercial applications, hybrid supplemental solar energy collection and dissipation system 90', FIG. 5, with one or more heat pumps 102 includes second heat pump 105 with source side 180 having source input port 182 and source output port 184 coupled to one or more loads, e.g. storage tank 96 and load side 186 coupled to load 190 as shown. System 90' also includes second controller 106 coupled to temperature sensors 303, 304, circulator 188, and heat pump 105 as shown.

One or more heat pumps 102 and/or 105 typically produce financial savings when they operate with coefficient of performance (COP) greater than the value of electricity/value of thermal energy. For example, assume that the economic "balance point" is at a COP of 3 where the electricity is a 3 times more valuable than thermal energy. This is not unusual because some steam engines/turbines operate at approximately 33% efficiency or require three units of thermal energy to produce one unit of electrical energy. When one or more heat pumps 102 and/or 105 operate below this economic balance point, COP alternate fuels can be more economical. In operation, the source fluid into the input port of the source side of one or more heat pumps 102, 105 cannot exceed a specific temperature. For example, the Waterfurnmace NDW100 heat pump (Water-Furnace International, Inc., Fort Wayne, Ind. 46809) does not recommend operation with source temperatures above 120° F. This is why heat pumps 102 and/105 have not yet been matched with conventional glazed or evacuated tube solar collectors. However, one or more supplemental solar energy collectors 94, FIGS. 3-5, discussed in detail above do not achieve the high temperatures typical of conventional solar thermal collectors. One or more supplemental solar energy collectors 94 also have the benefit of direct thermal contact with the environment, e.g. bottom surface 136, FIG. 4 directly exposed to environment 134. A typical conventional glazed solar collector system has its absorber surface inside an insulated box or evacuated tube and thus is a poor radiator of thermal energy back to the environment. Another conventional solar collector system uses an evacuated tube system in a vacuum which is an even worse radiator of thermal energy. One or more supplemental solar energy collectors 94 of hybrid supplemental solar energy collection and dissipation system 90 with one or more heat pumps of one or more embodiments of this invention has the unusual thermal characteristic of being directly exposed to the environment that complements pairing well with heat pumps 102 and/or 105 by being able to both efficiently absorb and dissipate thermal energy. This characteristic is an important modeling coefficient to determine the performance of a solar thermal collector called FrUc, also referred to as Slope. The Solar Rating Certification Corporation (SRCC) is a recognized third party organization that reviews and published the FrUc coefficient with their OG100 certifications. The higher in magnitude the FrUc coefficient the greater the collectors ability to dissipate energy to the atmosphere. An example glazed conventional collector TitanPower-ALDH29 SRCC OG100 (SunMaxx Solar LLC, Conklin, N.Y. 13748), certification #1001868, has a FrUc coefficient=−3.982 W/m²-° C. An example of a conventional evacuated tube collector ThermoPower-VHP10 (SunMaxx Solar LLC, Conklin, N.Y. 13748), certification #2006011B, has a FrUc coefficient=−1.322 W/m²-° C. In contrast, one or more supplemental solar energy collectors 94, e.g. Solar SDM100 collector, discussed above, certification #2007044A, has a FrUc coefficient equal to about −11.080 W/m²-° C. The larger in magnitude the coefficient the greater the collectors ability to dissipate energy. Thus, one or more supplemental solar energy collectors 94 of system 90 has much better capability of radiating thermal energy over conventional thermal collectors.

Figure 6A:
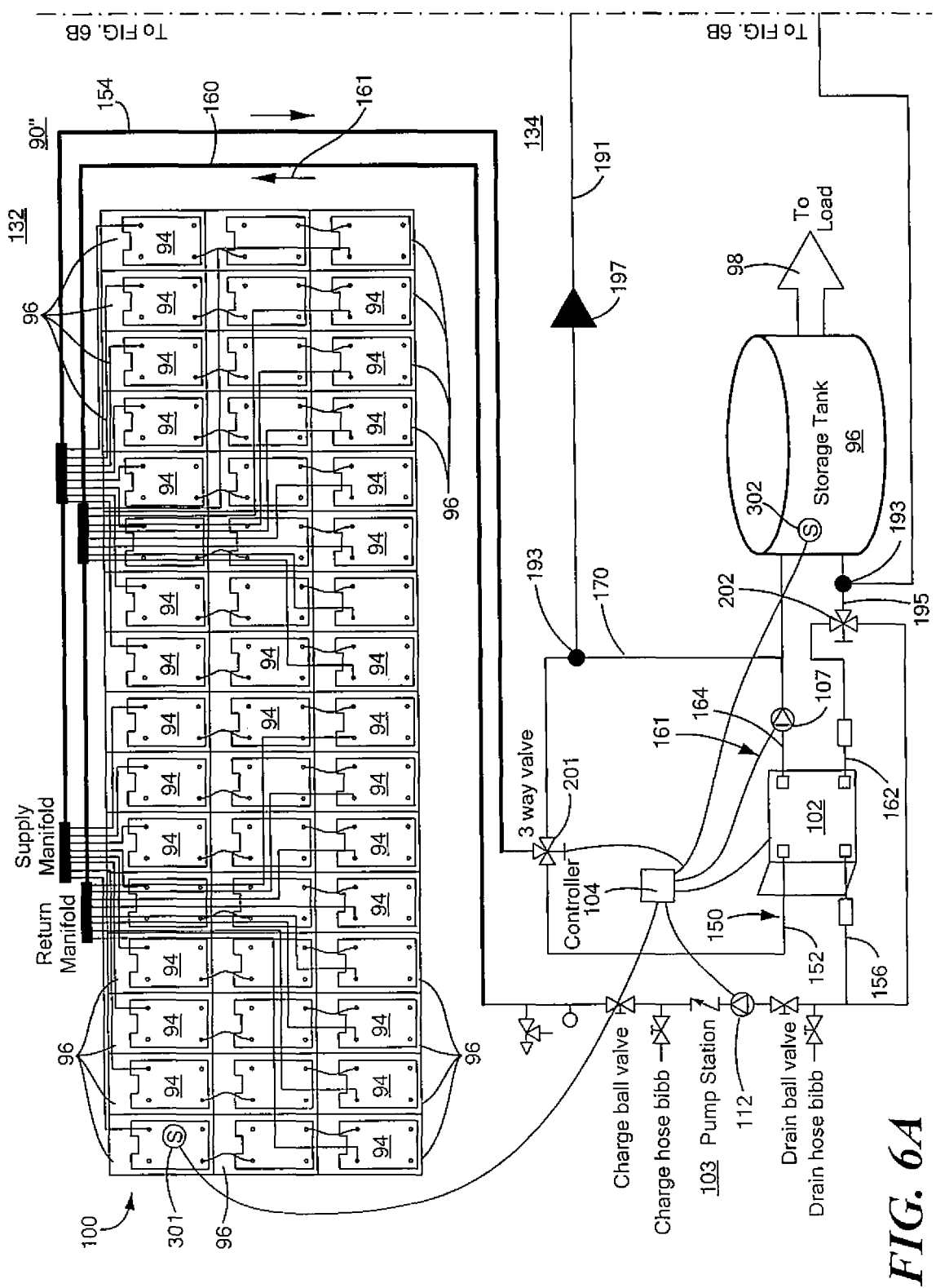
FIGS. 6A-6B are schematic block diagrams showing the primary components of another embodiment of the hybrid supplemental solar energy collection and dissipation system with one or more heat pumps of this invention.
Figure 6B:
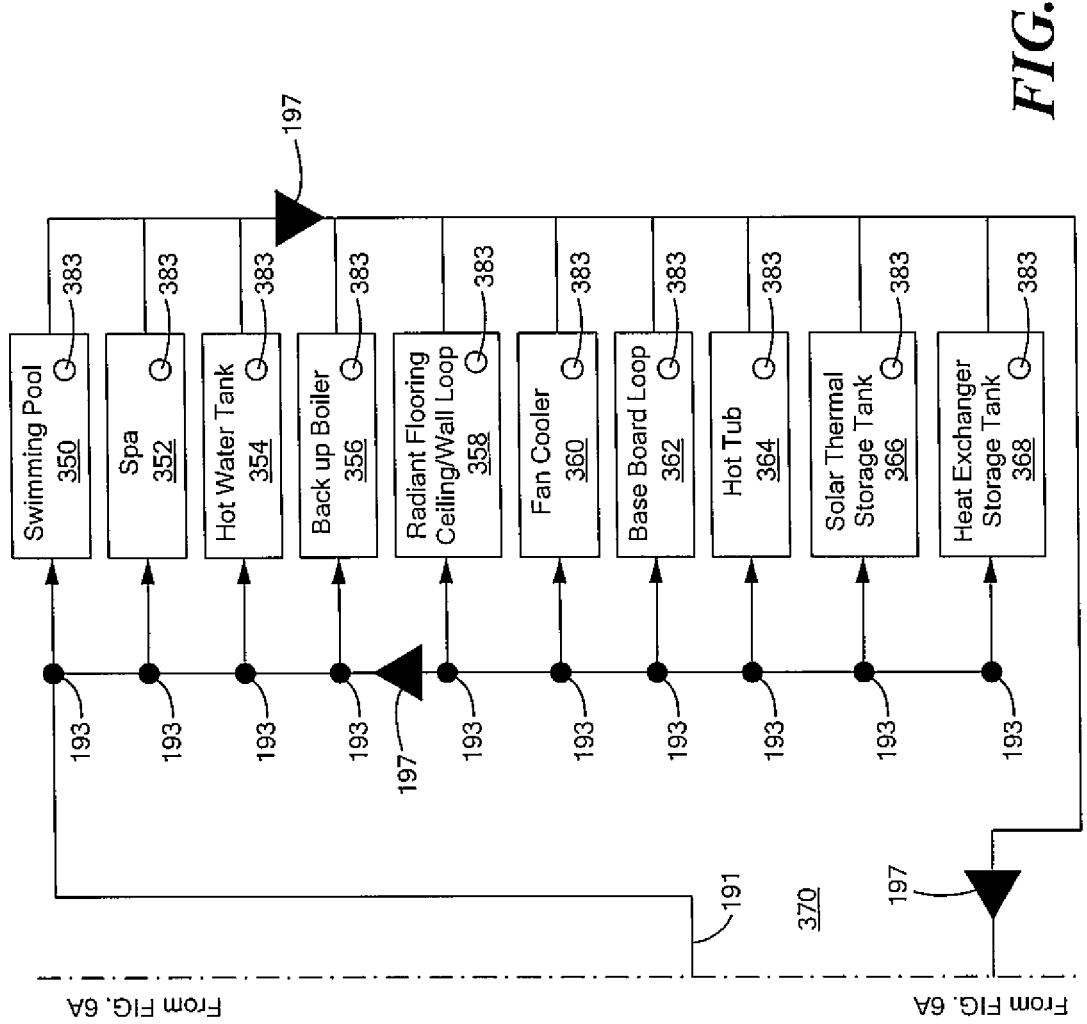

For those cases where the COP is less than economically viable or in a predetermined condition, such as when the temperature of one or more supplemental solar energy collectors 94 and commercially available photovoltaic panels 92 preferably configured as array 100 exceed the operating condition, e.g., (when the sun is delivering enough energy to heat the module above 120° F.) hybrid supplemental solar energy collection and dissipation system 90", FIGS. 6A-6B, with one or more heat pumps 102 of another embodiment of this invention can bypass one or more heat pumps 102 and directly heat the one or more loads, such as storage tank 96 or load output 98 of storage tank 96.

On the other hand, in another predetermined condition, e.g., when the weather conditions are cloudy or even during evening periods after the sun has set, system 90" can activate one or more heat pumps 102 to provide for continued heat collection as long as acceptable conditions allow.

In one embodiment, hybrid supplemental solar energy collection and dissipation system 90", FIGS. 6A-6B, with one or more heat pumps 102 preferably includes a plurality of valves, e.g., three way values 201, 202 coupled one or more supplemental solar energy collectors 94, one or more heat pumps 102, and the one or more loads, e.g., storage tank 96 as shown, configured to bypass heat pump 102 at one predetermined condition, e.g., during preferred solar conditions such that thermal energy in a flow of fluid from the one or more solar energy collectors 94 by supply line 154 is directed to heat and/or cool the one or more loads, e.g., storage tank 96 or load output 98 of storage tank 96, or additional loads using line 191 and a plurality of valves 193, as will be discussed in further detail below.

The plurality of valves, e.g. valves 201, 202 also preferably configured to direct the flow of fluid from one or more solar energy collectors 94 by supply line 154 to source input port 152 of one or more heat pump 102 and a flow of fluid from the one or more load, e.g., storage tank 96 or load output 98 of storage tank 96 to load input port 164 of one or more heat pumps 102 at another predetermined condition, e.g., when COP is above a predetermined level, to amplify the heating and/or cooling of the one or more loads.

For example, system 90" may include three-way valve 201 which may be coupled to supply line 154, source input port 150, output of circulator 107 feeding the one or more loads, e.g. storage tank 96 or load output 98 of storage tank 96. System 90" may also include three-way valve 202 coupled between load input port 162, heat pump output port 156, and storage tank 96 as shown. Three-way valves 201, 202 are preferably connected to controller 104. In this design, when solar conditions allow, the efficiency of system 90" can be enhanced by intelligently controlling the flow of thermal energy in the fluid in supply line 154 from one or more supplemental solar collectors 94 directly to storage tank 96 or load output 98 of storage tank 96 by bypassing one or more heat pumps 102 with controller 104, temperature sensors 301, 302 and three-way valves 201, 202. Then, when COP is above a predetermined level, e.g., about 3, controller 104 activates three-way valves 201, 202, so that the fluid in supply line 154 is fed to source input port 152 of one or more heat pumps 102 and fluid from storage tank 96 is fed into load input port 162 of one or more heat pumps 102 and one or more heat pumps 102 is utilized as discussed above. Controller 104 will shut down hybrid solar photovoltaic/thermal system 90" when inadequate energy is available for an acceptable financial return.

Figure 7A:
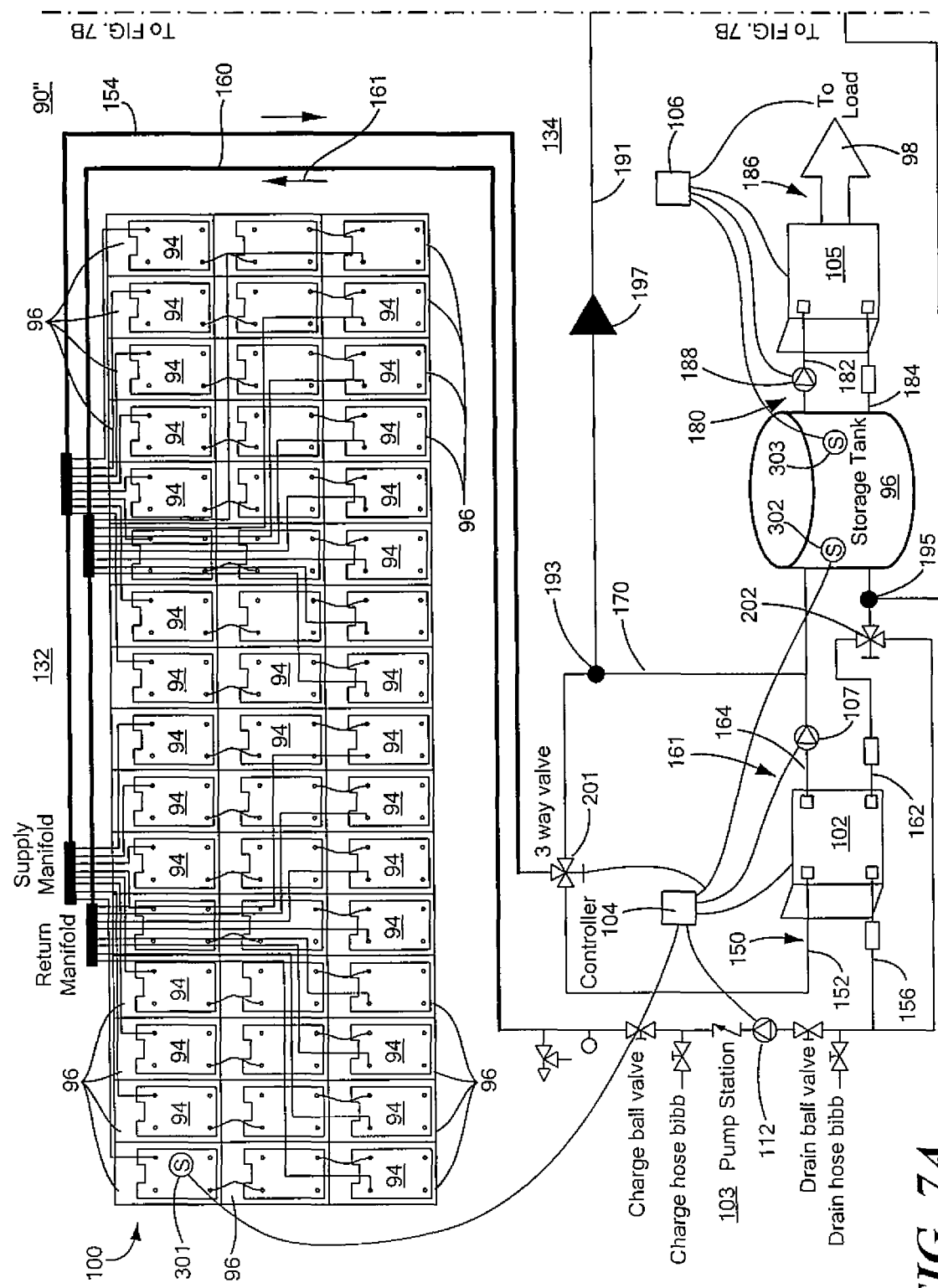
FIGS. 7A-7B are diagrams showing the primary components of another embodiment of the hybrid supplemental solar energy collection and dissipation system with one or more heat pumps of this invention.
Figure 7B:
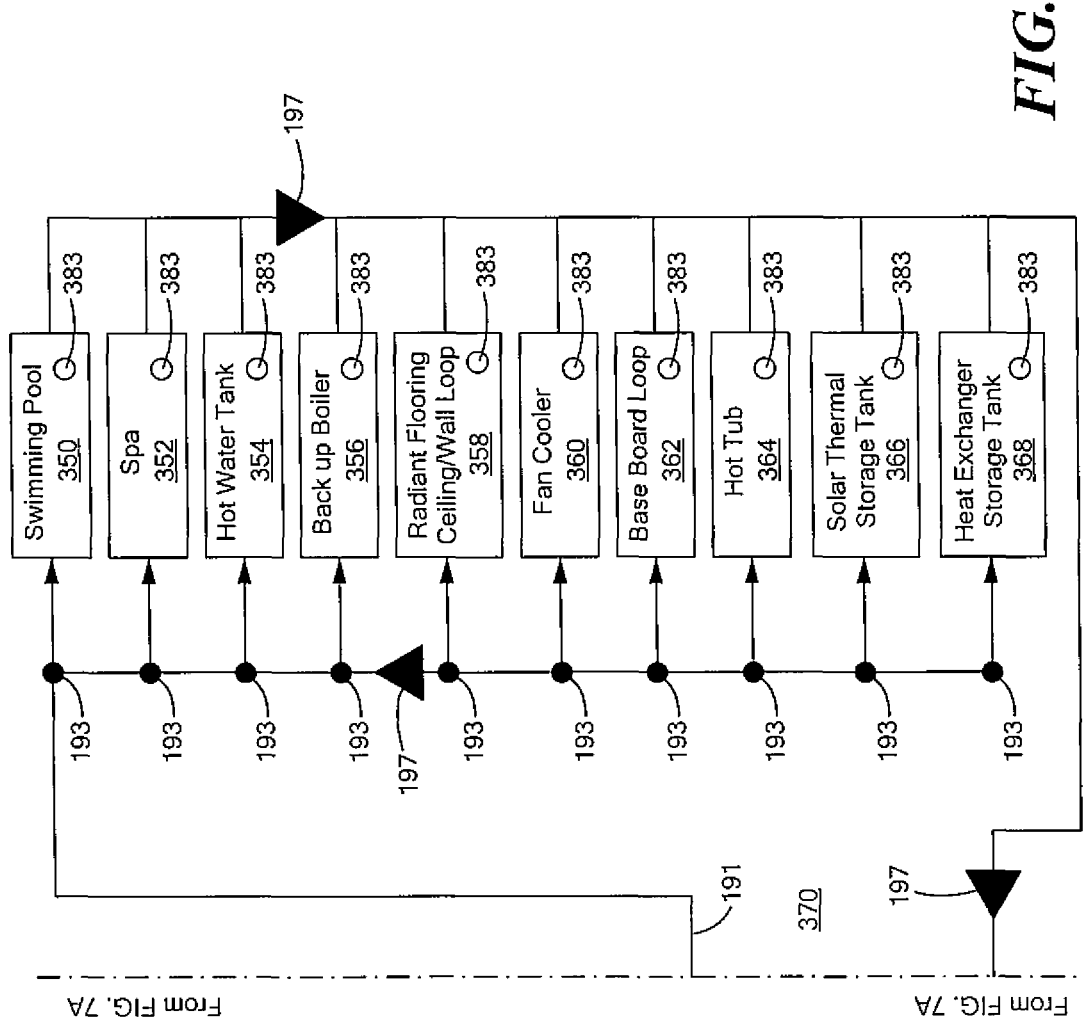

In one design, hybrid supplemental solar energy collection and dissipation system 90", FIGS. 7A-7B, preferably includes two heat pumps, e.g., heat pumps 102, 105 as discussed above with reference to FIG. 5. Similarly, heat pump 105 includes source side 180 having input port 182 and output port 184 coupled to storage tank 96 and load side 186 coupled to load 189 as shown. System 90" also preferably includes and second controller 106 coupled to temperature sensors 303, 304, circulator 188, and heat pump 105. Depending upon which controller 104, 106 is selected, controllers 104, 106 can be combined into one and eliminate redundant sensors. For example, one controller for entire system 90" could rely upon sensor 302 only and eliminate sensor 303 to determine storage temperature.

In addition, the nominal COP of 3 may not be optimum in different geographies and with different utility rates and local incentives. System 90" with one or more heat pumps 102 and/or 105 is flexible enough to set the acceptable COP higher or lower as financial conditions mandate, as will be discussed in the examples below.

The COP of one or more heat pumps 102 can vary by brand, compressor design, and phase change fluid. However, the relative performance of a heat pump is a function of load temperature versus the source temperature. By implementing an algorithm that models this performance along with desired target, controller 104 of one more embodiments of this invention can calculate temperature decisions to provide the most energy with heat pump assistance, direct solar, or shut both down due to inadequate/non-advantageous conditions as discussed below.

For example, in the case of space heating, assume a desired target temperature of 80° F. to load 190, FIGS. 7A-7B, and heat pump 102 is capable of delivering a COP of 4.0 or greater when source fluid temperature Ta-301 in line 154 is greater than 40° F. but less than 110° F. As the sun rises in the morning, temperature sensor 302 in storage tank 96 detects the target temperature of 80° F. has not been achieved and the source fluid temperature Ta-301 in one or more supplemental solar energy collectors 94 is about 40° F. Controller 104 controls three-way valve 201 to direct fluid from line supply 154 to input port 152, three-way valve 202 to direct fluid from storage tank 96 to load input port 162 and engages heat pump 102, circulator 107 and solar source array pump 103. In this example, as the sun continues to rise, the solar array fluid temperature Ta-301 is detected to reach 110° F. At this point, controller 104 uses an algorithm (discussed below) to direct heat pump 102 and circulator 107 to shut down and engage three way valves 201, 202, to bypass heat pump 102 while maintaining power to pump station 103. This causes the heated fluid in supply line 154 from one or more supplemental solar energy collectors 94 to be sent to storage tank 96 by line 170 to directly contribute to load 190. As the sun drops in the afternoon and temperature Ta-301 drops below 110° F., controller 104 disengages three-way valves 201 and 202, engages heat pump 102, circulator 112, and pump station 103. This causes the fluid in supply line 154 to be directed to source input port 152 of heat pump 102. Heat pump 102 then operates as discussed above until the lower threshold is reached, where the heating system would shut off until acceptable conditions allow.

For example, when system 90", FIGS. 6A-6B and 7A-7B, is providing cooling, assume a set a desired temperature of 60° F. for the one or more loads, e.g., in this example, storage tank 96 or load output 98 of storage tank 96, FIGS. 6A-6B, or load 190, FIGS. 7A-7B. Heat pump 102 and/or heat pump 105 is capable of delivering a COP of 4 Energy Efficiency Ratio (EER) equal to about 13.6 or greater when the source fluid is 90° F. to 20° F. As the sun rises in the morning, or in low sunlight conditions, sensor Ta-301 detects when the source fluid in one or more supplemental solar energy collectors 94 is above 90° F. and controller 104 directs the fluid in supply line 154 directly to the one or more loads, e.g., a thermal storage mass, such as storage tank 96 or load output 98 of storage tank 96, swimming pool 350, spa 352, hot water tank or heater 354, backup boiler 356, radiant floor/ceiling/wall loop 358, fan coil 360 for space heating and/or cooling, baseboard loop 362, spa hot tub 364, solar thermal storage tank 366, heat exchanger storage tank 368, solar glycol loop 370, or similar type devices. Loads 350-370 may be directly heated by line 191 coupled to line 171 or heated by load output 98 of storage tank 96. One example, system 90", FIGS. 6A-6B and 7A-7B, includes a plurality of valves 193 as shown configured to direct the source fluid in supply line 154 to loads 350-370 and back to line 195 in a loop indicated by arrows 197. Such a loop may be referred to as a solar glycol loop 370 when the source fluid includes glycol therein. Any of loads 96, 98 and 350-370 may absorb or dissipate thermal energy. Any of loads 350-370 may also have temperature sensor 383 therein which may be coupled to controller 106.

As conditions allow and the temperature of source fluid in one or more supplemental solar energy collectors 94 drops below 90° F., controller 104 shifts the fluid to one or more heat pumps 102 and/or 105 as discussed above and heat pumps 102 and/or 105 are engaged to provide cooling. During the evening/night time or low light conditions operation, the source fluid in one or more supplemental solar energy collectors 94 can achieve temperatures below ambient to provide greater cooling efficiencies than many air source heat pumps (traditional air conditioning units) that are limited to ambient air temperature.

Figure 8:
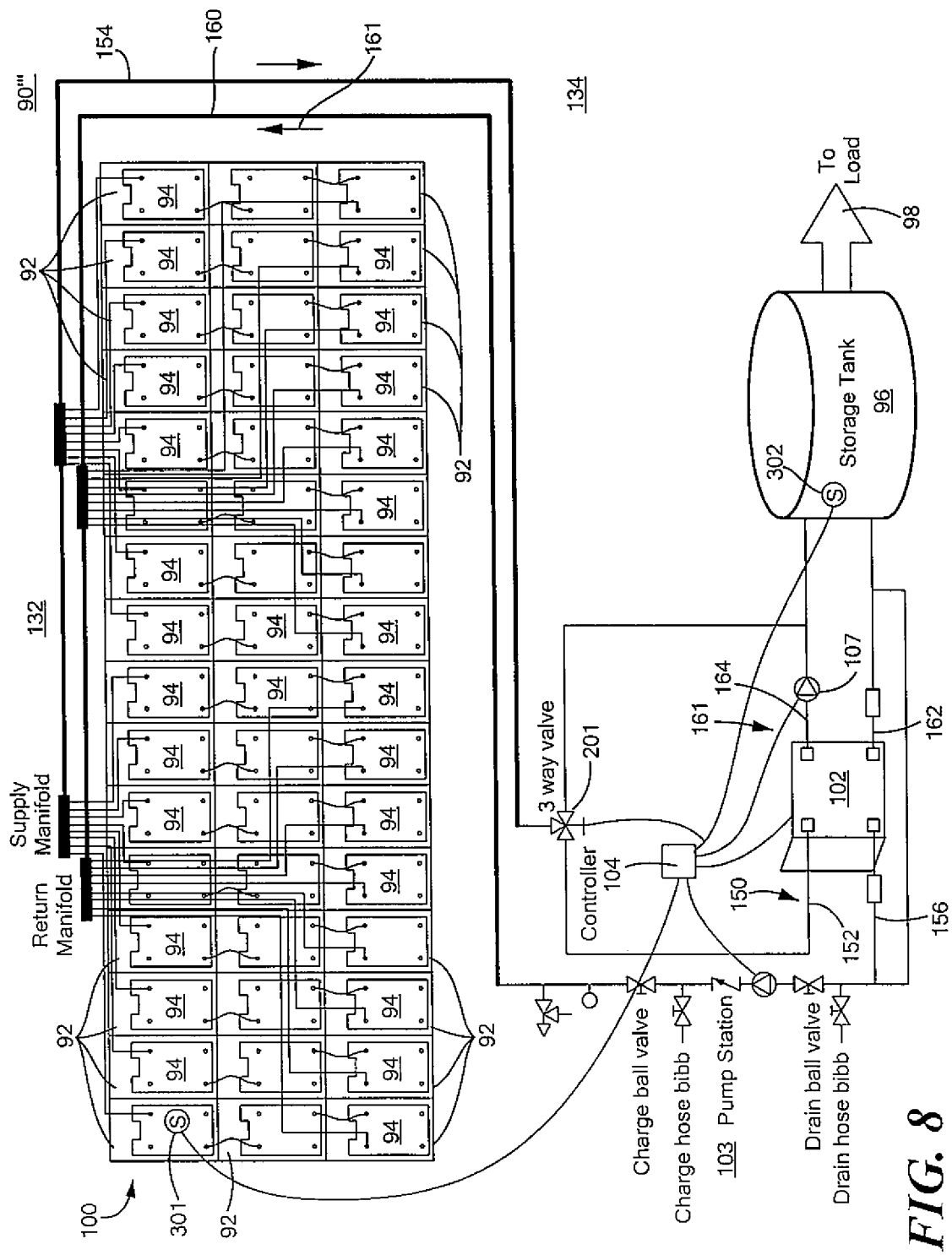
FIG. 8 is a schematic diagram showing the primary components of one embodiment of the hybrid supplemental solar energy collection and dissipation system with one or more heat pumps of this invention.
Figure 9:
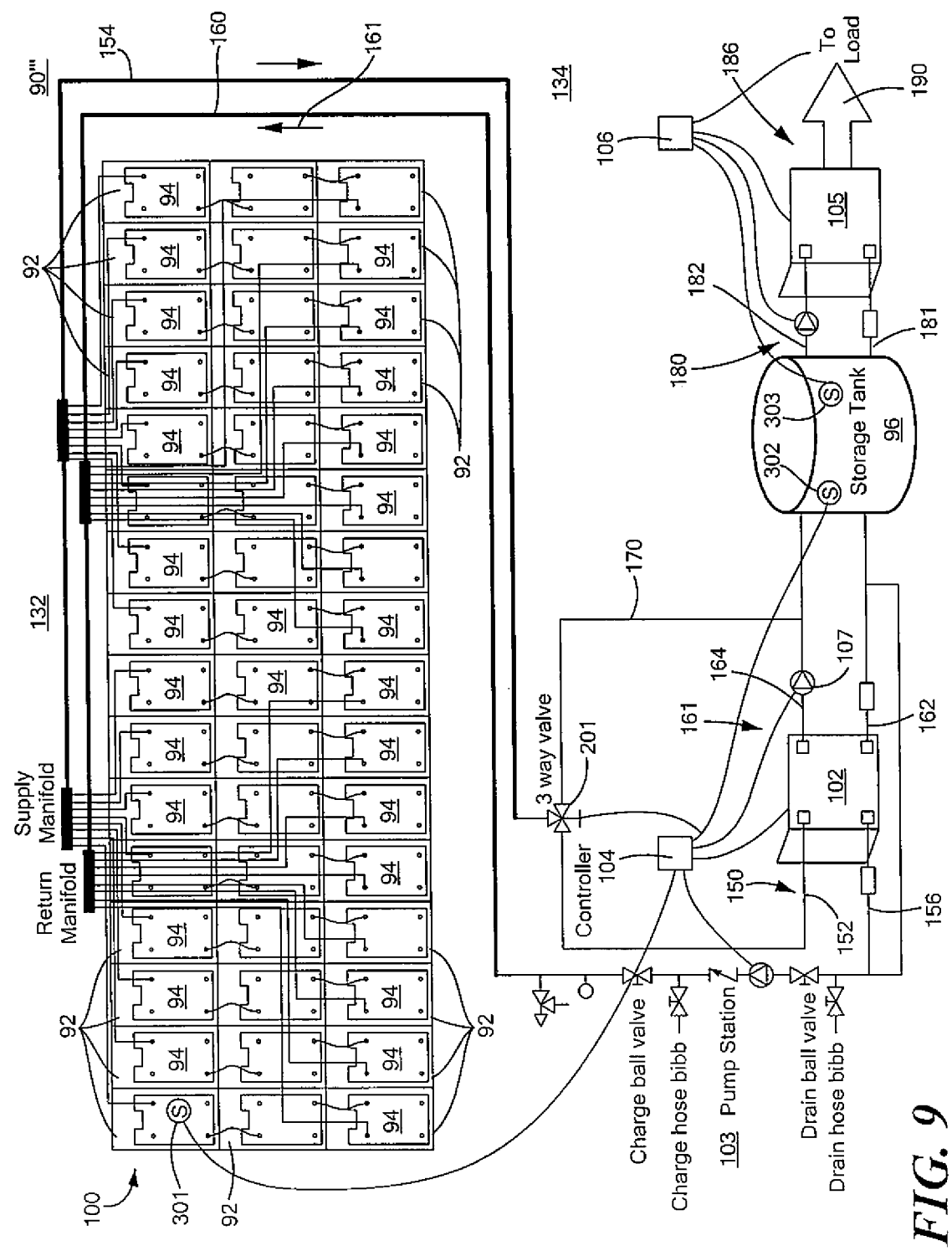
FIG. 9 is a schematic diagram showing the primary components of one embodiment of the hybrid supplemental solar energy collection and dissipation system with one or more heat pumps of this invention.

Hybrid supplemental solar energy collection and dissipation system 90''', FIGS. 8 and 9, with one or more heat pumps 102 and/or 105 of another embodiment provides a simplification of hybrid solar photovoltaic/thermal heat pump system 90" shown in FIGS. 6A-6B and 7A-7B. In this embodiment, system 90''', FIGS. 8-9, eliminates three-way valve 202, FIGS. 6A-6B and 7A-7B as shown and the control logic and plumbing are simplified. However, the elimination three-way valve 202 may affect array pressure. For cases where this is not acceptable, three-way valve 202, FIGS. 6A-6B and 7A-7B may be preferred.

Figure 10:
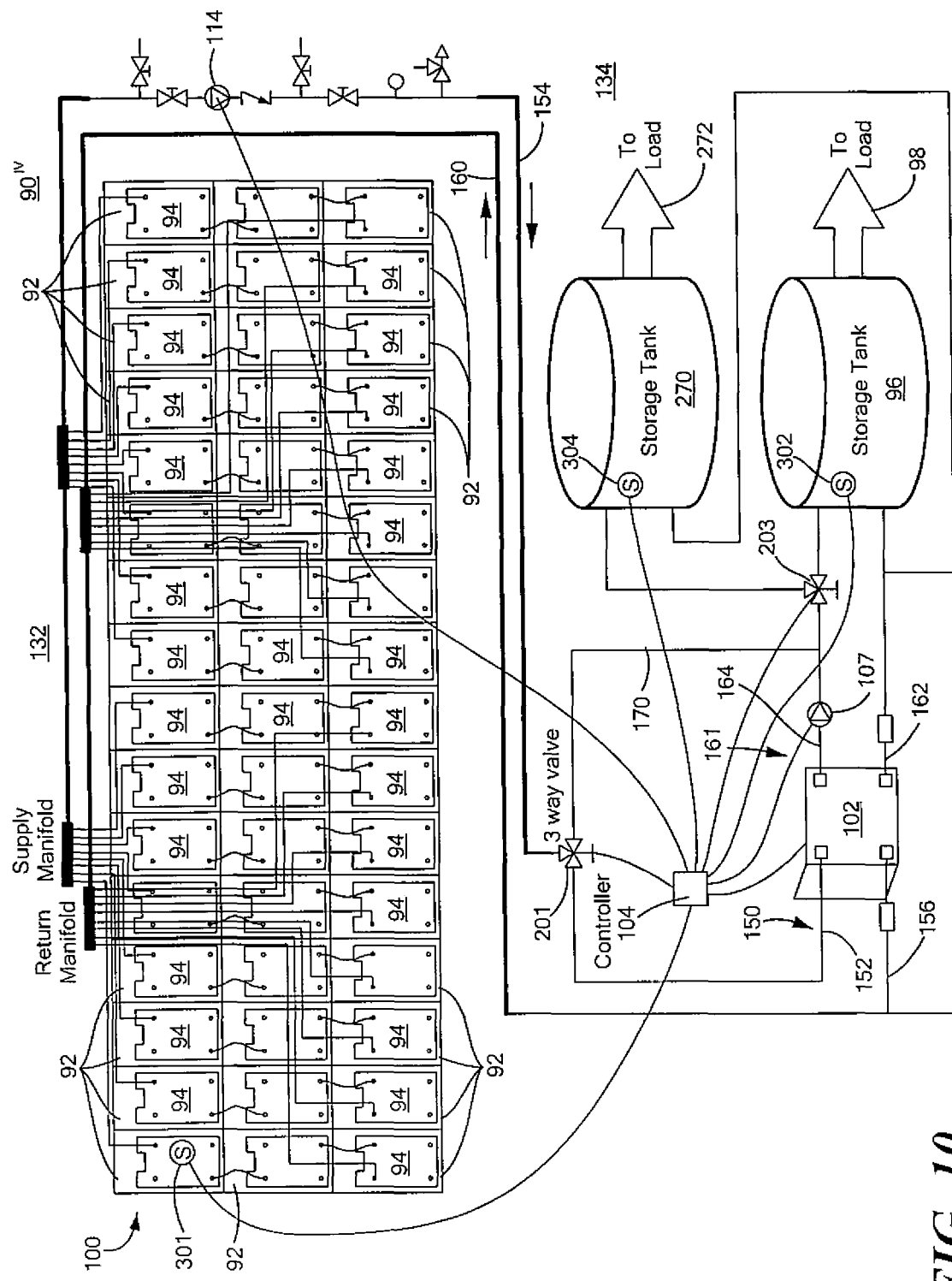
FIG. 10 is a schematic diagram showing the primary components of one embodiment of the hybrid supplemental solar energy collection and dissipation system with one or more heat pumps of this invention.

Hybrid supplemental solar energy collection and dissipation system $90^{IV}$, FIG. 10 with one or more heat pumps 102 of another embodiment of this invention may be utilized where heating and cooling loads are always present. In this embodiment, system $90^{IV}$ includes second storage tank 270 with temperature sensor 304 coupled to controller 104 and three-way valve 203 coupled between output of circulator 107, line 170, and storage tank 96 and second storage tank 270 with load output 272 as shown. For pressure sensitive implementations, three-way valve 202, FIGS. 6A-6B and 7A-7B may be utilized.

One exemplary implementation hybrid solar photovoltaic/thermal heat pump system $90^{IV}$, FIG. 10, may be a fitness center which needs to heat a pool when possible or to provide de-humidification. In this case, in one predetermined condition, e.g., when sunlight is available, system $90^{IV}$ is in heating mode as discussed above and contributes the thermal energy directly to storage tank 270 and load 272. In another predetermined condition, e.g., in the evening when the sun is not available, system $90^{IV}$ can shift to cooling mode and contribute energy directly to storage tank 96 or load output 98 of storage tank 96. Storage tank 270 could be a swimming pool itself, in which case it becomes load 272. Both storage tanks 96, 270 would preferably allow their class of energy to be contributed when direct contribution is not possible or preferred. Similarly as discussed above, controller system 104 is coupled to temperature sensors 301, 302, 304, pump station 103, circulator 107, three-way valve 201, and one or more heat pumps 102 and is capable of prioritizing which type of energy collection mode has priority over the other when conditions could allow for both. Modifications of this design can include directly servicing the load without a storage tank or adding heat pumps on the load side of storage tank 96 and/or 270 to amplify thermal energy.

Hybrid supplemental solar energy collection and dissipation system $90^{IV}$ with one or more heat pumps 102 also preferably includes circulator pump 114 on a supply line 154 from one or more supplemental solar energy collectors 94 configured to draw fluid from one or more supplemental solar energy collectors 94. Such a location of circulator pump on supply line 154 may also be used by system 90 shown in one or more of FIGS. 3-12. This location preferably minimizes the amount of pressure exerted on one or more supplemental solar energy collectors 94 to preferably extend its reliability. Typical implementations are on the return side to allow the coolest fluid to pass through the pump. However since this technology is capable of both heating and cooling, the location of the pump station on the supply side is possible.

For enablement purposes only, the following code portion is provided which can be executed by controller 104 and/or controller 106 shown in one or more of FIGS. 3-12 to carry out the primary steps and/or functions of the system 90 discussed above and recited in the claims hereof. Other equivalent algorithms and code can be designed by a software engineer and/or programmer skilled in the art using the information provided therein:

Terms

Tcoph-min—minimum temperature array fluid to run at specified COP heating mode
Tcoph-max—maximum temperature array fluid to run at specified COP heating mode
Tcopc-min—minimum temperature array fluid to run at specified COP Cooling mode
Tcopc-max—maximum temperature array fluid to run at specified COP cooling mode Ts—Storage tank temperature (manufacturer's load fluid temperature)
Ta—Temperature of one or more supplemental solar energy collectors (manufacturer's source fluid temperature)
Tl—Temperature of the one or more loads
Tdh-on—On temperature delta in bypass mode
Tdh-off—Off temperature delta in bypass mode
Tdc—delta for cooling bypass mode
Thp-min—minimum temperature source fluid allowed by manufacturer
Thpc-max—maximum temperature source fluid allowed by manufacturer in cooling mode.
Thph-max—maximum temperature source fluid allowed by manufacturer in heating mode.
Thp-max1—maximum (temperature source fluid+temperature load fluid) allowed For system 90, FIG. 3 in heating mode:
Pump Station 103, circulator 107 and one or more heat pumps 102 are on if:
Thp-min<Ta; (Ts−Tcoph-max)<Ta; Ta+Ts<Thp-max1; and Ta, Ts<Thp-max are true.

Tcoph-max is a function of the heat design of pump 102. For example this might be 55° F. to attain a COP of 4 or better. In other words, if storage tank 96 is 55° F. hotter than the temperature of one or more supplemental solar energy collectors 94, one or more heat pumps 102 requires more electricity and drops to less than COP of 4 to continue delivering thermal energy.

Thp-min is determined by the manufacturer specification for example, could be set to 15° F. if a fluid used is able to maintain the specified flow rate at this temperature and the phase change fluids freeze point is below this temperature. If water was used the Thp-min would be typically set to 33° F.

Thp-max1 is also a function of heat pump design setting the combined temperature limit before the unit will over heat. In this example we will consider it to be set at 160° F.

Thp-max is the individual compressor temperature limit set by the manufacturer. In this example we will use 110° F.

The examples above are using constants. However, the manufacture can set them as dependent variables, in which case the constant would be replaced by the manufacturer's specification.

For System 90, FIG. 3, in cooling mode:
Pump station 103, circulator 107, and one or more heat pumps 102 are on if:
Thp-min<Ta<(Ts+Tcopc-max), Ta+Ts<Thp-max1, and Ts<Thpc-max, are true.

In this case for a desired COP of 4 or energy efficiency ratio (EER) of 13.6 (EER=COP×3.41) a typical manufacturer's specification requires a Tcopc-max of 0. If a COP of 3 was acceptable for cooling Tcopc-max of 10° F. might be acceptable. When one or more heat pumps 102 is used to amplify the energy in the storage tank 96 on the load side, the same algorithms are used except Ta is replaced with Ts and Ts with Tl A maximum Ta of 110° F. and a combined maximum temperature for Ta+Ts of 160° F. could be produced by 80° F. each for Ta and Ts (80+80=160) or any other such combination to the limit. There could be cases where an installation is desired to provide heating and will frequently exceed these conditions. For example, three-way valves 201, 202, 203, FIGS. 5-9, can be added. Three way valves are preferably actuated into bypass mode if the heating algorithm is untrue and, Ta>Ts+Tdh-on.

An example would be Tdh-on of 6° F. where if one or more heat pumps 102 limits prevent unit operation and Ta is 6° F. hotter than Ts the three way valves would actuate and pump station 103 would turn on. This is a unique feature where system 90, shown in one or more of FIGS. 3-10, is able to maximize the total availability of solar energy. One or more heat pumps 102 can be used to amplify solar energy in poor light conditions when the array is typically between 15° F. and approximately 80° F. Once the available insolation exceeds the maximum allowable array temperature threshold condition of one or more heat pumps 102 the unit is shut down. But if the suns energy allows Ta to exceed the storage temperature one or more heat pumps 102 loop is bypassed and energy continues to be collected directly to storage or load.

This feature allows system 90 to collect thermal energy over a much longer period of time each day than traditional solar systems and even allows collection of latent solar energy in the atmosphere on overcast days and even at night when direct sunlight is not available. Since system 90 is hybrid solar it also generates electrical energy, with the result that all forms of energy delivered can be from renewable sources.

One exemplary use of system 90 would be a hotel where early in the morning its guests take showers consuming available solar storage dropping the temperature of storage tank 96 down to about 50° F. As soon as the ambient temperature is greater than 15° F. one or more heat pumps 102 will amplify solar energy stored in the atmosphere and start heating the tank 96. For example, suppose the temperature is raised to 77° F. before the sun reaches high enough in the sky to achieve 83° F., e.g., about 11 a.m. At this point system 90", FIGS. 6A-6B and 7A-7B, shuts down one or more heat pumps 102 and actuates the three-way valves 201, 202 to direct delivery of thermal energy to tank 96. In this example, from 11 a.m. to about 3 p.m. direct solar energy is able to heat storage tank 96 to 130° F. and one or more heat pumps 102 is shut down since the sun is again in decline and Ta+Ts>160. By 4:30 guests return and start consuming hot water. By 6 p.m. the temperature in storage tank 96 has dropped to about 90° F. and array temperature in one or more supplemental solar energy collectors 94 in array 100 is about 69° F. Controller 104 will then engage one or more heat pumps 102 to allow the solar energy stored in the atmosphere to contribute thermal energy to the hotel. This feature can significantly extend the amount of time solar array/system 90" is able to contribute. It also improves the financial performance of system in more challenging climates like most U.S. northern states.

Hybrid supplemental solar energy collection and dissipation system $90^{IV}$, FIG. 10, with one or more heat pumps 102 where both heating and cooling are required preferably includes additional three-way valve 203 as discussed above. Three-way valve 203 is preferably positioned such that the un-actuated position is for the heating system. The intelligent control produced by controller 104 prioritizes either cooling or heating mode for the occasions that both can be provided by the system. Three-way valve 203 would then be actuated when the control system determines that cooling is required and available.

One example of the use of system $90^{IV}$ may be a corporate campus with data center. A corporate campus typically has a high domestic hot water load while the data center needs twenty four hours cooling every day due to the restricted temperature conditions for servers to operate correctly. To maximize the energy value of one or more supplemental solar energy collectors 94, in this embodiment, controller 104 provides intelligent control which may be programmed to deliver heating energy when Ta>Ts, and shift over to direct heating when Ta+Ts>160 and Ta>Ts+Tdh-on then back to one or more heat pumps 102 amplification when conditions allow. However once Ta<Ts, one or more heat pumps 102 reverses to cooling mode and three-way valve 203 shifts to tank 96, which may be used to provide air conditioning to the data center. The owner can control the prioritization of cooling versus heating by defining what point cooling is engaged. If cooling is prioritized, then the switch over point may be defined as Ta<(Ts+Tcopc-max). In some cases with cooling mode, the owner may want to shift to direct cooling. For example when Ta<(Ts−Tdc), the owner could save on heat pump power if the fluid temperature of one or more supplemental solar energy collectors 94 was cooler than the storage temperature. In this case, Tdc could be defined as 30° F. Thus, if the temperature of array fluid at sensor 301 is 40° F. while the temperature in storage tank 96 is 70° F., direct cooling would be provided. Since array 100 is able to provide useful energy potentially throughout the day on demand, array 100 can provide the greatest financial return.

The balance of energy needs can determine how to maximize the advantages of the hybrid solar array and heat pump technology. For example, assume an energy profile where cooling load significantly exceeds heating load.

Figure 11:
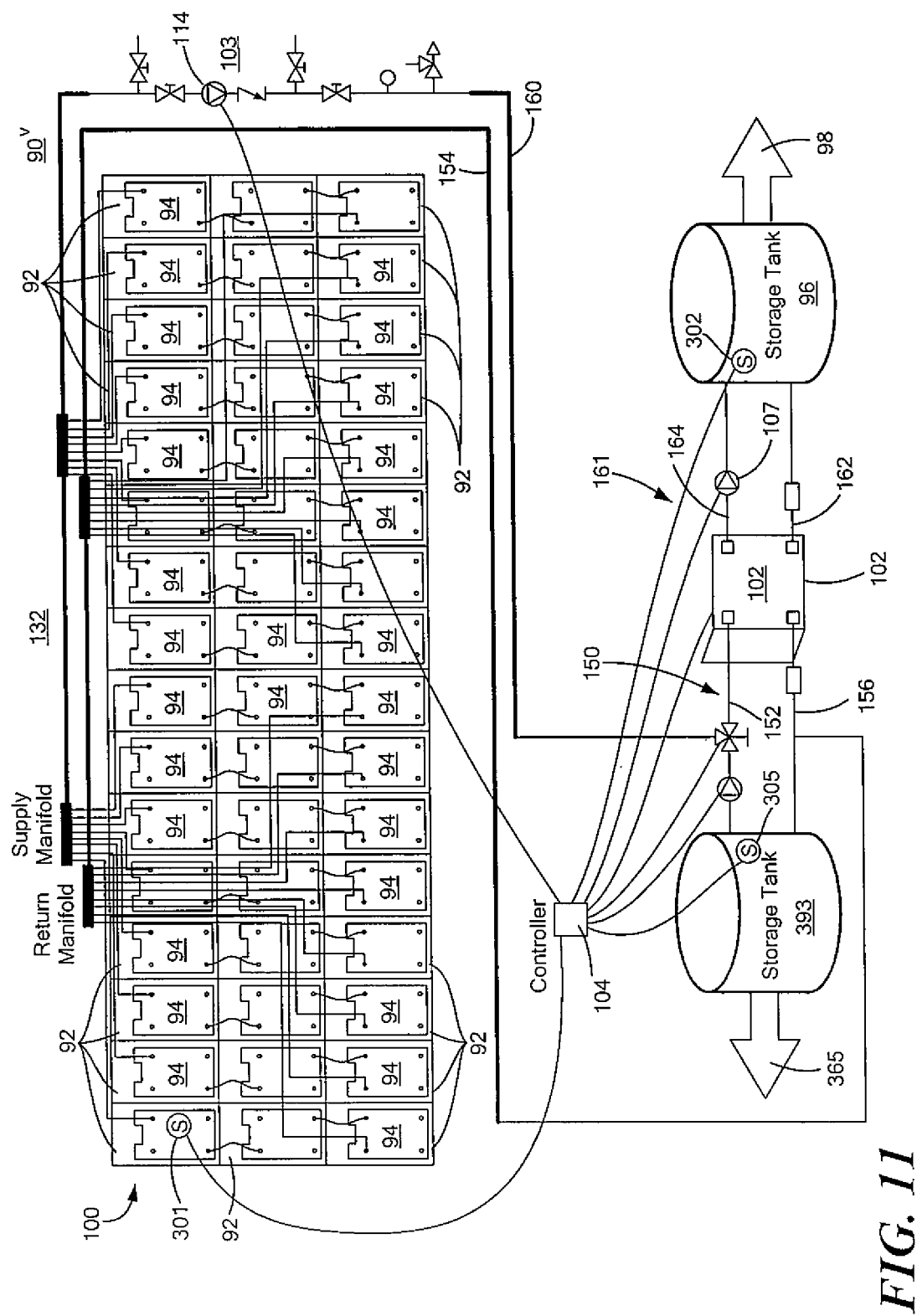
FIG. 11 is a schematic diagram showing the primary components of one embodiment of the hybrid supplemental solar energy collection and dissipation system with one or more heat pumps of this invention.

Hybrid supplemental solar energy collection and dissipation system $90^V$, FIG. 11, with one or more heat pumps of another embodiment of this invention shows one example of how the one or more heat pumps 102 can be configured to transfer the thermal energy from one or more loads to a different load of the one or more loads, e.g., cooling tank 96 into the heating tank 393. Tanks 96 and 393 may be reversed to heating and cooling respectively to maximize heating capability of the system.

For example, the thermal portion of the one or more supplemental solar energy collectors 94 may be engaged via valve 201 when conditions were optimum to dissipate the energy in storage tank 96 through the hybrid array rather than storage tank 393. The thermal portion of one or more supplemental solar energy collectors 94 can also be engaged during sunlight hours to heat storage tank 108 directly if the heat pump was disengaged. An example of this would be during very cold seasons when cooling load is minimal and more heating energy is required. An example of this profile would be a dairy farm or data storage center.

Figure 12:
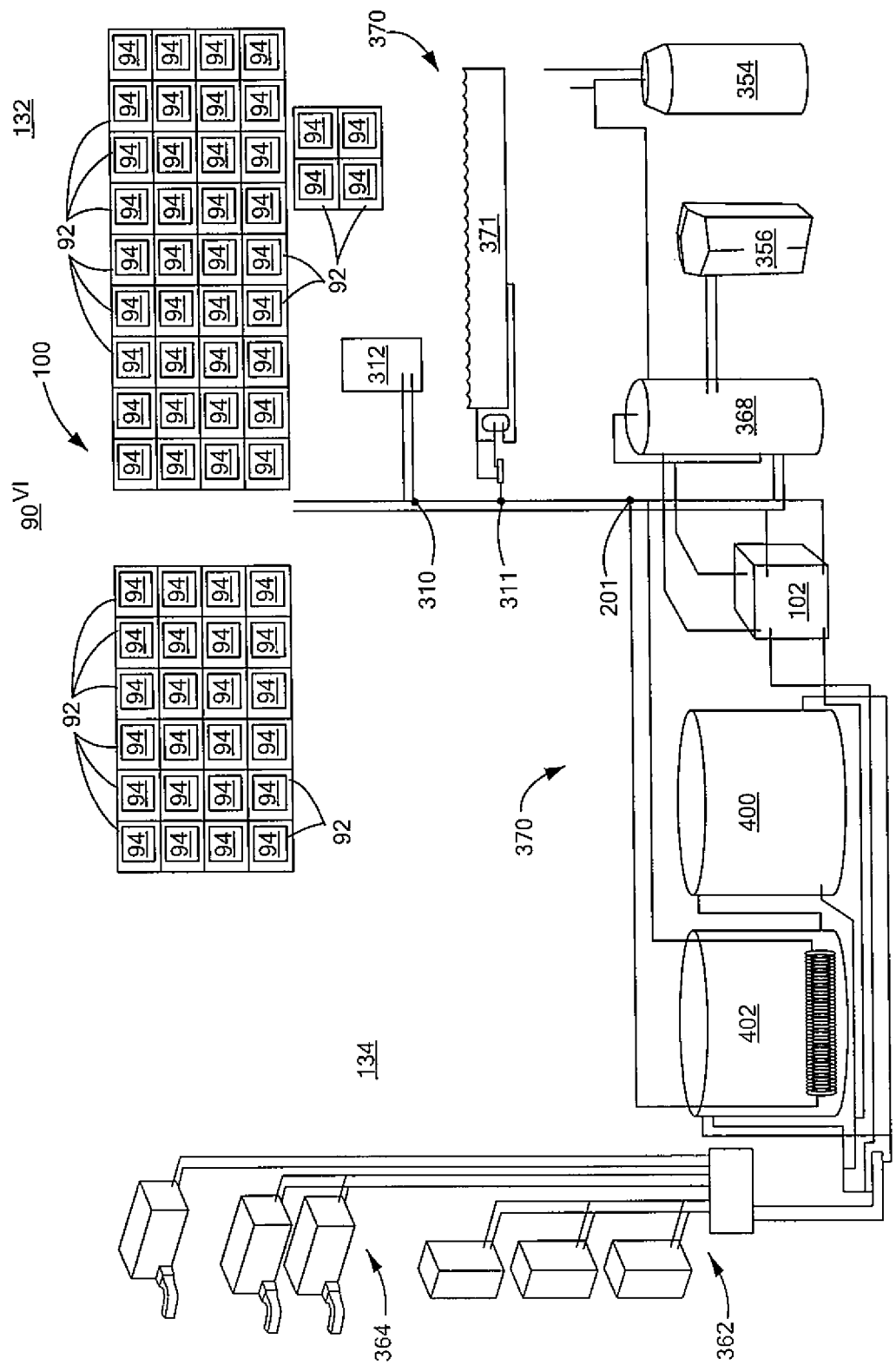
FIG. 12 is a schematic diagram showing the primary components of one embodiment of the hybrid supplemental solar energy collection and dissipation system with one or more heat pumps of this invention.

Hybrid supplemental solar energy collection and dissipation system $90^{VI}$, FIG. 12, with one or more heat pumps 102 of another embodiment of this invention includes one or more supplemental solar energy collectors 94 which are preferably configured to extract thermal energy from photovoltaic panels 92 and/or extract thermal energy from environment 134 at one predetermined condition to heat one or more of the loads, e.g. a thermal storage mass, such as heat exchanger 312, hot water heater 354, heat exchanger back-up boiler 356, heat exchanger solar storage tank 368, solar glycol loop 370 with swimming pool 371, base board loop 362, lift loop 364, storage tank 400, or storage tank 402 and/or radiate thermal energy to space and/or dissipate thermal energy to environment 134 to cool another of the one or more loads, e.g. a different load of loads 354, 356, 362, 364, 368, 370, 400, 402 at a second predetermined condition. Loads 354, 356, 362, 364, 368, 370, 400, and 402 preferably absorb or dissipate thermal energy. One or more heat pumps 102 are similarly configured to amplify the heating and/or cooling of the one or more loads.

Preferably, the thermal energy extracted from one or more solar energy collectors 94 and/or the environment 134 is stored in one or more of the one or more loads 354, 356, 362, 364, 368, 370, 400, 402.

One or more heat pumps 102 are preferably configured to use the stored thermal energy in one or more of the one or more loads to amplify heating and/or cooling of another of the one or more loads.

For example, hybrid supplemental solar energy collection and dissipation system $90^{VI}$ with one or more heat pumps includes many loads. In one example, thermal energy in tank 402 may be transferred to pool 371 via heat pump 102 to provide cooling to the home and heat the pool at the same time. In this way the system energy in one or more loads is transferred to another of the one or more loads. System $90^{IV}$ also includes one or more supplemental solar energy collectors 94 coupled to selected photovoltaic panels 94 and preferably configured as array 100 as discussed above. System $90^{VI}$ also includes one or more heat pumps 102, in this example, a water-to-water reversible heat pump with de-superheating, heat exchanger 312, heat exchanger solar storage tank 368, back-up boiler 356, water heater 354, solar glycol loop 370, base board loop 322, lift loop 324, and multiple three-way valves e.g. 201, 310, and 311.

System $90^{IV}$ allows for automatic control for the multiple system functions, including but not limited to, domestic water preheating via direct solar collection from array 100, domestic hot water preheating source one or more heat pumps 102 system de-superheating loop whenever one or more heat pumps 102 is running, day or night, solar space/storage tank heating, solar space/storage tank cooling, swimming pool heating from summer solar storage cooling waste heat recovery, solar storage cooling with waste heat rejection via direct night sky reradiating to space, solar storage cooling with nocturnal waste heat rejection to roof collectors and cooling tower.

For example during one predetermined condition, e.g., a heating period, thermal energy from the one or more supplemental solar energy collectors 94 can be used to supply space heating to storage tank 402 via three-way valve 201 is in a bypass mode, use heat pump assist 102 with space heating when three-way valve 201 is in heat pump mode, or heating pool 371 by engaging valve 310 with related pool heating mode, when excess energy is available.

Then, when it is beneficial, the stored energy in pool 371 can be used heat or cool another load, e.g., to supply space heating rather than one or more supplemental solar energy collectors 94 by engaging valve 310. This may occur on very cold evenings when the sun is not available and the temperature of the pool water is higher than the collectors and the heat pump could provide heating at greater COP's than the collectors.

Conversely during another predetermined condition, e.g., a cooling period at night, thermal energy can be dissipated to space through one or more supplemental solar energy collectors 94 and heat pump 102 is used to assist dissipating thermal energy to space through one or more supplemental solar energy collectors 94 when desired, e.g., peak sunlight hours, the thermal energy can be dissipated to the pool 371 by engaging valve 311 and bypassing one or more supplemental solar energy collectors 94. This would provide the dual benefit of air conditioning (space cooling) and pool heating. If the pool temperature is raised more than desired at night the pool can be cooled down by dissipating additional energy through the collectors.

The example discussed above is just one example where system $90^{VI}$ can not only absorb or dissipate thermal energy to or from one or more supplemental solar energy collectors 94 to one or more loads, but also transfer thermal energy to or from the one or more loads in either direction. When load to load thermal transfer is used at some other time period one or more supplemental solar energy collectors 94 may be used to balance the thermal energy. For example if the one or more loads, in this example pool 371, is used for heating the absorbed thermal energy will later be replaced with energy from one or more supplemental solar energy collectors 94. In another example, when pool 371 is being used as a heat dump or thermal storage mass for cooling and exceeds desired temperatures at some other time the excess thermal energy can be dissipated through the one or more supplemental solar energy collectors 94. In this example, pool 371 is used as a load. Any thermal storage mass can be used in this way in conjunction with the collectors using one or more heat pump 102 to amplify transfer or alternately use direct piping. In this way any load in system $90^{VI}$ can also be a source at another time.

Figure 13:
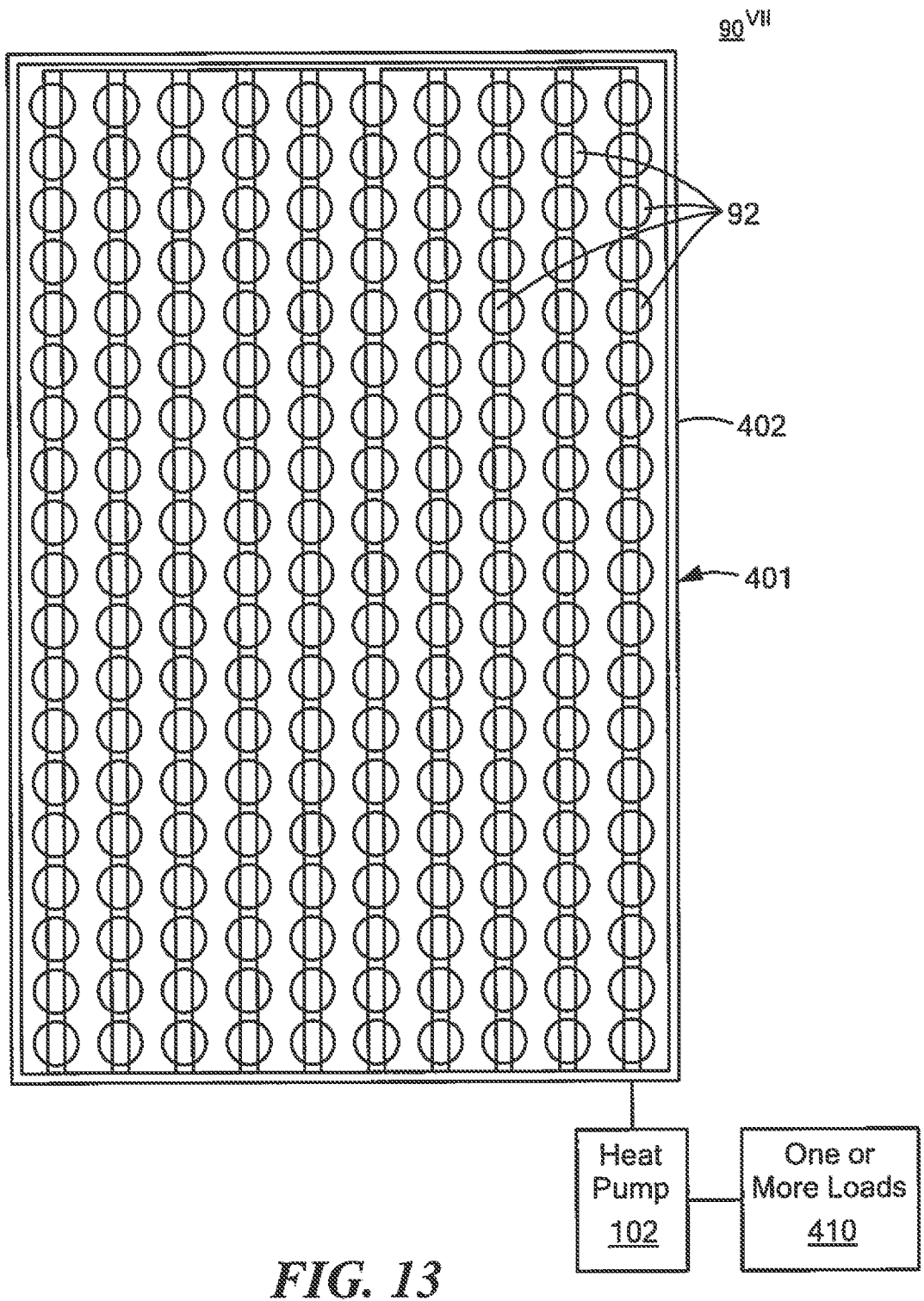
FIGS. 13-15 are schematic block diagrams showing the primary components of one embodiment of the integrated, supplemental, solar energy collection and dissipation system with one or more heat pumps of one embodiment of this invention.
Figure 14:
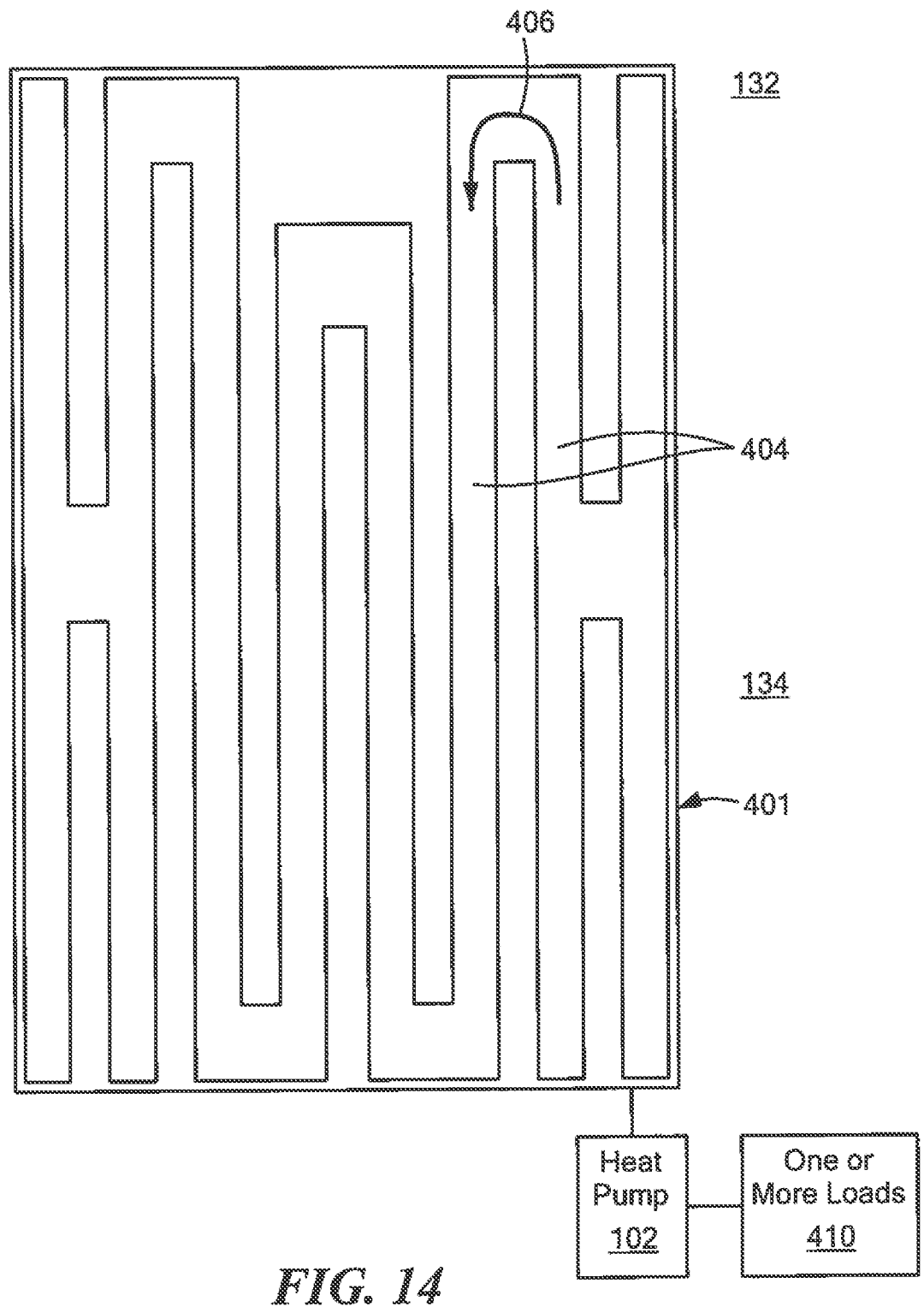
Figure 15:
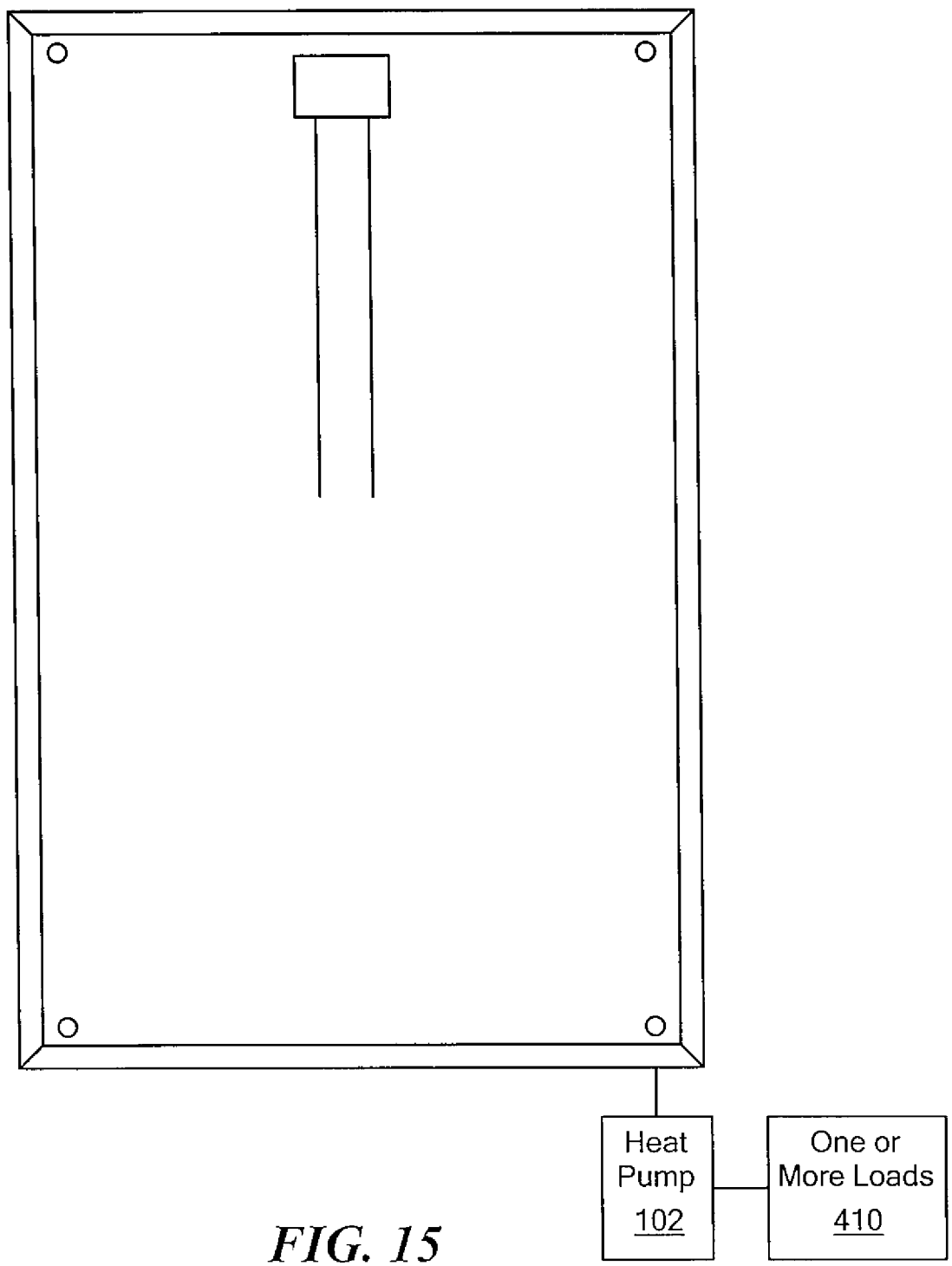

Although as discussed above with reference to one or more of FIGS. 3-12, system 90 includes one or more supplemental solar energy collectors 94 which are selectively coupled to one or more photovoltaic panels 92, this is not a necessary limitation of this invention. 1n another embodiment, system $90^{VII}$, FIG. 13, includes one or more photovoltaic panels, e.g., photovoltaic panel 92 that includes housing 401. Housing 401 includes bottom surface 402 made of a thermally conductive material and is mated to photovoltaic panel 92. Housing 401 also includes channels 404, FIG. 14, having a flow of fluid therein, indicated at 406, between photovoltaic panel 92 and bottom surface 402 configured to collect thermal energy from photovoltaic panel 92, radiate thermal energy to space 132, collect thermal energy from environment 134, and/or dissipate thermal energy to environment 134 to heat and/or cool one or more loads 410. System $90^{VII}$, FIGS. 13-14, also includes one or more heat pumps 102, similar as discussed above with reference to one or more of FIGS. 3-12, coupled to housing 401 configured to amplify heating and/or cooling of the one or more loads 410. Thus, in this example, channels 404, FIG. 14, are integrated with photovoltaic panel 92, FIG. 13, itself. By expanding the construction to fluid channels 404 on the back of top surface 138, FIG. 4, top of one or more supplemental solar energy collectors 94 can be eliminated and the back surface 420 now becomes the top of the housing with fluid channels therein. Thus, housing 401 is fully integrated with the photovoltaic construction as shown in FIG. 15. Further details of the integrated photovoltaic; panel and housing 401, FIGS. 13-14 are disclosed in the '745 patent cited supra and incorporated by reference. Integrated system $90^{VII}$ can be used for any of the embodiments shown in FIGS. 3 and 5-12.

The functions discussed above are only illustrative of the level of complexity that can be incorporated into the design. However, all of the above may utilize one or more embodiments of hybrid supplemental solar energy collection and dissipation system 90 with one or more heat pumps invention, shown in one or more of FIGS. 3-12, which combine hybrid solar (photovoltaic/thermal) collectors capable of absorbing and radiating thermal energy with heat pump technology to maximize the contribution of renewable energy.

Additionally, alternative one or more supplemental solar energy collectors 94 known by those skilled in the art may be used by system 90, FIGS. 3-12, which may have the capability to generate electricity, collect thermal energy and dissipate thermal energy, are not connected to heat pumps to allow both heating and cooling, nor would it be obvious to do so as they are typically of a form that would not allow efficient use of such coupling.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

What is claimed is:

1. A hybrid supplemental solar energy collection and dissipation system with one or more heat pumps, the system comprising:
   one or more photovoltaic panels configured to convert incident radiation to electricity;
   one or more supplemental solar energy collectors having a flow of fluid therein selectively coupled to the one or more photovoltaic panels, the one or more supplemental solar energy collectors configured to collect thermal energy from the one or more photovoltaic panels, radiate thermal energy to space, collect thermal energy from an environment and/or dissipate thermal energy to the environment to heat or cool one or more loads; and
   the one or more heat pumps coupled to the one or more supplemental solar energy collectors by a supply line and one or more supply manifolds and a return line and one or more return manifolds, the one or more heat pumps also coupled to the one or more loads by an input port and an output port, the one or more supply manifolds and the one or more return manifolds each operatively and directly connected to the one or more supplemental solar energy collectors and the supply line and the return line each operatively and directly connected to the one or more heat pumps such that the one or more supplemental solar energy collectors provide a thermal energy source to the one or more heat pumps configured to amplify heating and/or cooling of the one or more loads.

2. The system of claim 1 in which the one or more supplemental solar energy collectors are configured to have a portion thereof directly exposed to the environment to efficiently dissipate and/or radiate the thermal energy.

3. The system of claim 2 in which the one or more supplemental solar energy collectors includes one or more thermally conductive surfaces.

4. The system of claim 3 in which the one or more thermally conductive surfaces includes a top surface directly coupled to the one or more photovoltaic panels.

5. The system of claim 3 in which the one or more thermally conductive surfaces includes a bottom surface directly exposed to the environment.

6. The system of claim 1 in which the one or more heat pumps includes a source side with a source input port for receiving a flow of fluid from the one or more supplemental solar energy collectors and a source output port for returning a flow of fluid to the one or more supplemental solar energy collectors.

7. The system of claim 1 in which the one or more heat pumps includes a load side with a load input port for receiving a flow of fluid from the one or more loads and a load output port for outputting a flow of fluid to the one or more loads.

8. The system of claim 1 in which the one or more heat pumps includes a fluid-to-fluid heat pump.

9. The system of claim 1 in which in which the one or more loads includes one or more thermal storage masses.

10. The system of claim 9 in which the one or more loads includes one or more of: a storage tank, a swimming pool, a solar thermal storage tank, a heat exchanger storage tank, a hot water tank, a backup boiler, a water heater, a solar glycol loop, a radiant floor and/or ceiling and/or wall loop, a fan coil for space heating and/or cooling, a baseboard loop, a spa, and a hot tub.

11. The system of claim 1 in which the one or more supplemental solar energy collectors are configured to extract thermal energy from the one or more photovoltaic panels and/or extract thermal energy from the environment at one predetermined condition to heat one or more of the one or more loads and/or radiate thermal energy to space and/or dissipate thermal energy to the environment to cool another of the one or more loads at a second predetermined condition.

12. The system of claim 11 in which the thermal energy extracted from the one or more photovoltaic panels and/or the environment is stored in one or more of the one or more loads.

13. The system of claim 12 in which the one or more heat pumps is configured to use the stored thermal energy in one or more of the one or more loads to amplify heating and/or cooling of another of the one or more loads.

14. The system of claim 1 further including a plurality of temperature sensors coupled to one or more of the supplemental solar energy collectors, and the one or more loads.

15. The system of claim 1 further including a circulator pump on a return line to the one or more supplemental solar energy collectors configured to drive fluid to one or more of the supplemental solar energy collectors.

16. The system of claim 1 further including a circulator pump on a supply line from the one or more supplemental solar energy collectors configured to draw fluid from the one or more supplemental solar energy collectors.

17. The system of claim 15 further including a controller coupled to one or more temperature sensors coupled to the one or more supplemental solar energy collectors and the one or more loads, the plurality of valves, the one or more heat pumps, and the circulator pump configured to control the flow of fluid from the solar energy collectors, the heat pump, and the one or more loads.

18. The system of claim 16 further including a controller coupled to one or more temperature sensors coupled to the one or more supplemental solar energy collectors and the one or more loads, the plurality of valves, the one or more heat pumps, and the circulator pump configured to control the flow of fluid from the supplemental solar energy collectors, the heat pump, and the one or more loads.

19. The system of claim 1 in which electrical energy needed to operate the heat pump is configured to be drawn from the photovoltaic panels.

20. The system of claim 1 in which the one or more heat pumps includes a first heat pump coupled to an input of a storage tank and a second heat pump coupled to an output of the storage tank.

* * * * *